United States Patent
Park et al.

(10) Patent No.: US 9,717,060 B2
(45) Date of Patent: Jul. 25, 2017

(54) METHOD FOR TRANSMITTING OR RECEIVING ACK/NACK SIGNAL

(71) Applicant: LG ELECTRONICS INC., Seoul (KR)

(72) Inventors: Jonghyun Park, Anyang-si (KR); Byounghoon Kim, Anyang-si (KR); Hanbyul Seo, Anyang-si (KR); Hakseong Kim, Anyang-si (KR); Suckchel Yang, Anyang-si (KR)

(73) Assignee: LG Electronics Inc., Seoul (KR)

( * ) Notice: Subject to any disclaimer, the term of this patent is extended or adjusted under 35 U.S.C. 154(b) by 326 days.

(21) Appl. No.: 14/382,479

(22) PCT Filed: Mar. 20, 2013

(86) PCT No.: PCT/KR2013/002276
§ 371 (c)(1),
(2) Date: Sep. 2, 2014

(87) PCT Pub. No.: WO2013/141594
PCT Pub. Date: Sep. 26, 2013

(65) Prior Publication Data
US 2015/0110017 A1   Apr. 23, 2015

Related U.S. Application Data

(60) Provisional application No. 61/614,500, filed on Mar. 22, 2012.

(51) Int. Cl.
*H04W 52/48* (2009.01)
*H04L 1/18* (2006.01)
(Continued)

(52) U.S. Cl.
CPC .......... *H04W 52/48* (2013.01); *H04L 1/1861* (2013.01); *H04L 5/001* (2013.01); *H04L 5/0055* (2013.01);
(Continued)

(58) Field of Classification Search
CPC . H04J 3/00; H04L 1/1692; H04L 5/00; H04L 5/0055; H04W 52/48; H04W 72/04
See application file for complete search history.

(56) References Cited

U.S. PATENT DOCUMENTS

2009/0245194 A1   10/2009   Damnjanovic et al.
2011/0267995 A1   11/2011   Li et al.
(Continued)

FOREIGN PATENT DOCUMENTS

CA    2792556 A1   11/2011
CN    101019345 A   8/2007
(Continued)

OTHER PUBLICATIONS

Huawei, "UL ACK/NACK feedback related DCI design for carrier aggregation", 3GPP TSG RAN WGI Meeting #60bis, Agenda Item: 6.2.4.1, Beijing, China, Apr. 12-16, 2010, 4 pages, R1-101943.
(Continued)

*Primary Examiner* — Andrew Lai
*Assistant Examiner* — Leon Andrews
(74) *Attorney, Agent, or Firm* — Birch, Stewart, Kolasch & Birch, LLP

(57) ABSTRACT

A user equipment (UE) detects control channels on multiple component carriers in a downlink subframe of a radio frame. An acknowledgement/negative-acknowledgement (ACK/NACK) signal for the detected control channels or data channels corresponding to the detected control channels is transmitted in an uplink (UL) resource region. The UE determines whether UL transmission (Tx) power control fields received at a respective one of the detected control channels are used as values indicating a resource region for
(Continued)

transmission of the ACK/NACK signal based on whether a respective one of the detected control channels carries triggering information for activating use of a UL Tx power control field of the respective control channel for aperiodic sounding reference signal (SRS) power control. The UE transmits the ACK/NACK signal in a UL resource region based on a result of the determining, or in a UL resource region linked to the respective one of the detected control channels.

12 Claims, 15 Drawing Sheets

(51) Int. Cl.
  *H04L 5/00* (2006.01)
  *H04L 5/14* (2006.01)
(52) U.S. Cl.
  CPC .......... *H04L 5/0023* (2013.01); *H04L 5/0035* (2013.01); *H04L 5/0048* (2013.01); *H04L 5/0094* (2013.01); *H04L 5/14* (2013.01)

(56) References Cited

U.S. PATENT DOCUMENTS

2012/0155337 A1*  6/2012  Park .................. H04L 1/1692
                                                       370/280
2013/0039307 A1    2/2013  Han et al.

FOREIGN PATENT DOCUMENTS

| CN | 102142941 A | 8/2011 |
| KR | 10-2010-0134068 A | 12/2010 |
| KR | 10-2011-0123199 A | 11/2011 |
| WO | WO 2010/146971 A1 | 12/2010 |

OTHER PUBLICATIONS

Texas Instruments, Resource Allocation for A/N Transmission on PUCCH, 3GPP TSG RAN WG1 #62, Agenda Item: 6.2.2.3, Madrid, Spain, Aug. 23-27, 2010, 4 pages, R1-104466.

* cited by examiner

PUCCH formats 1a and 1b structure (normal CP case)

PUCCH formats 1a and 1b structure (normal CP case)

FIG. 14

|      | DL SF #1 | DL SF #2 | DL SF #3 | DL SF #4 |
|------|----------|----------|----------|----------|
| PCell | DAI-counter = 1<br>TPC field: TPC | DAI-counter = 2<br>TPC field: ARI | No PDCCH | DAI-counter = 3<br>TPC field: ARI |
| SCell | No PDCCH | DAI-counter = 1<br>TPC field: ARI | DAI-counter = 2<br>TPC field: ARI | No PDCCH |

FIG. 15

|      | DL SF #1 | DL SF #2 | DL SF #3 | DL SF #4 |
|------|----------|----------|----------|----------|
| PCell | DAI-counter = 1<br>TPC field: TPC | PDSCH w/o PDCCH<br>(no DAI/TPC) | No PDCCH | DAI-counter = 2<br>TPC field: ARI |
| SCell | No PDCCH | DAI-counter = 1<br>TPC field: ARI | DAI-counter = 2<br>TPC field: ARI | No PDCCH |

METHOD FOR TRANSMITTING OR RECEIVING ACK/NACK SIGNAL

CROSS REFERENCE TO RELATED APPLICATIONS

This application is the national phase of PCT International Application No. PCT/KR2013/002276 filed on Mar. 20, 2013, which claims priority under 35 U.S.C. 119(e) to U.S. Provisional Application No. 61/614,500 filed on Mar. 22, 2012, which is incorporated by reference as if fully set forth herein.

FIELD OF THE INVENTION

The present invention relates to a wireless communication system, and more particularly to a method and apparatus for transmitting or receiving an uplink signal.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology that efficiently uses more frequency bands, cognitive ratio technology, multiple input multiple output (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, a node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which plural nodes communicate with a user equipment (UE) using the same time-frequency resources has much higher data throughput than legacy communication schemes in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered a kind of Multiple Input Multiple Output (MIMO) system since dispersed nodes can communicate with a single UE or multiple UEs by simultaneously transmitting/receiving different data streams. However, since the multi-node system transmits signals using dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease pathloss and enable rapid data transmission in a multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces conventional centralized antenna systems, becoming the foundation of a new form of cellular communication in order to reduce base station cost and backhaul network maintenance cost while extending service coverage and improving channel capacity and SINR in next-generation mobile communication systems.

DETAILED DESCRIPTION OF THE INVENTION

Technical Problem

An object of the present invention is to provide a method for transmitting or receiving an ACK/NACK signal regarding DL-associated or UL-associated downlink control information (DCI).

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for transmitting an ACK/NACK signal by a user equipment (UE) in a wireless communication system including: detecting control channels in a downlink subframe of a radio frame, wherein ACK/NACK signal for the detected control channels is transmitted in an uplink resource region; determining whether uplink (UL) transmission (Tx) power control values received at respective one of the detected control channels are used as values indicating a resource region for transmission of the ACK/NACK signal, and transmitting the ACK/NACK signal in an uplink resource region decided according to the result of the determining; and if all UL Tx power control values received at the respective one of the detected control channels are not used to indicate the resource region for transmission of the ACK/NACK signal, transmitting the ACK/NACK signal in an uplink resource region linked to the respective one of the detected control channels.

Additionally or alternatively, the method may further include: if at least one from among UL Tx power control values received at the respective one of the detected control channels is used as a specific value for indicating a resource region for transmission of the ACK/NACK signal, transmitting an ACK/NACK signal for all the detected control channels in the resource region indicated by the specific value.

Additionally or alternatively, the method may further include: determining whether the UL Tx power control value is used as a specific value for indicating a resource region for transmission of the ACK/NACK signal based on triggering information for activating that the UL Tx power control value is used for aperiodic sounding reference signal (SRS) power control.

Additionally or alternatively, if the UL Tx power control value is activated to be used for power control of the aperiodic sounding reference signal (SRS), the UL Tx power control value may not be used as a specific value for indicating a resource region for transmission of the ACK/NACK signal.

Additionally or alternatively, the triggering information may be provided for either each downlink subframe in the radio frame or each control channel.

Additionally or alternatively, if a downlink assignment index (DAI) received at the detected control channel is set to 1, the UL Tx power control value is not activated to be used for power control of the aperiodic sounding reference signal (SRS).

Additionally or alternatively, the UL Tx power control value may be a Transmit Power Control (TPC) command field contained in downlink control information (DCI).

In accordance with another aspect of the present invention, a user equipment (UE) device configured to transmit an ACK/NACK signal in a wireless communication system includes: a radio frequency (RF) unit; and a processor configured to control the RF unit, wherein the processor is configured to detect a control channel in a downlink subframe of a radio frame, and transmit ACK/NACK signal for the detected control channels in an uplink resource region, wherein the processor is configured to determine whether uplink (UL) transmission (Tx) power control values received at respective one of the detected control channels are used as values indicating a resource region for transmission of the ACK/NACK signal, and transmit the ACK/NACK signal in an uplink resource region decided according to the result of the determination, and if all UL Tx power control values received at the respective one of the detected control channels are not used to indicate the resource region for transmission of the ACK/NACK signal, the processor is configured to transmit the ACK/NACK signal in an uplink resource region linked to the respective one of the detected control channels.

Additionally or alternatively, the user equipment (UE) device may further include: if at least one from among UL Tx power control values received at the respective one of the detected control channels is used as a specific value for indicating a resource region for transmission of the ACK/NACK signal, the processor is configured to transmit an ACK/NACK signal for all the detected control channels in the resource region indicated by the specific value.

Additionally or alternatively, the processor may be configured to determine whether the UL Tx power control value may be used as a specific value for indicating a resource region for transmission of the ACK/NACK signal based on triggering information activating that the UL Tx power control value is used for aperiodic sounding reference signal (SRS) power control.

Additionally or alternatively, if the UL Tx power control value is activated to be used for power control of the aperiodic sounding reference signal (SRS), the UL Tx power control value may not be used as a specific value for indicating a resource region for transmission of the ACK/NACK signal.

Additionally or alternatively, the triggering information may be provided for either each downlink subframe in the radio frame or each control channel.

Additionally or alternatively, if a downlink assignment index (DAI) received at the detected control channel is set to 1, the UL Tx power control value is not activated to be used for power control of the aperiodic sounding reference signal (SRS).

Additionally or alternatively, the UL Tx power control value may be a Transmit Power Control (TPC) command field contained in downlink control information (DCI).

It is to be understood that both the foregoing general description and the following detailed description of the present invention are exemplary and explanatory and are intended to provide further explanation of the invention as claimed.

Effects of the Invention

As is apparent from the above description, the embodiments of the present invention can efficiently transmit or receive ACK/NACK signals regarding DL- or UL-associated downlink control information (DCI).

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

The accompanying drawings, which are included to provide a further understanding of the invention, illustrate embodiments of the invention and together with the description serve to explain the principle of the invention.

FIG. 14 exemplarily shows a downlink subframe according to the embodiments of the present invention.

FIG. 15 exemplarily shows a downlink subframe according to the embodiments of the present invention.

BEST MODE FOR CARRYING OUT THE INVENTION

Figure 1:
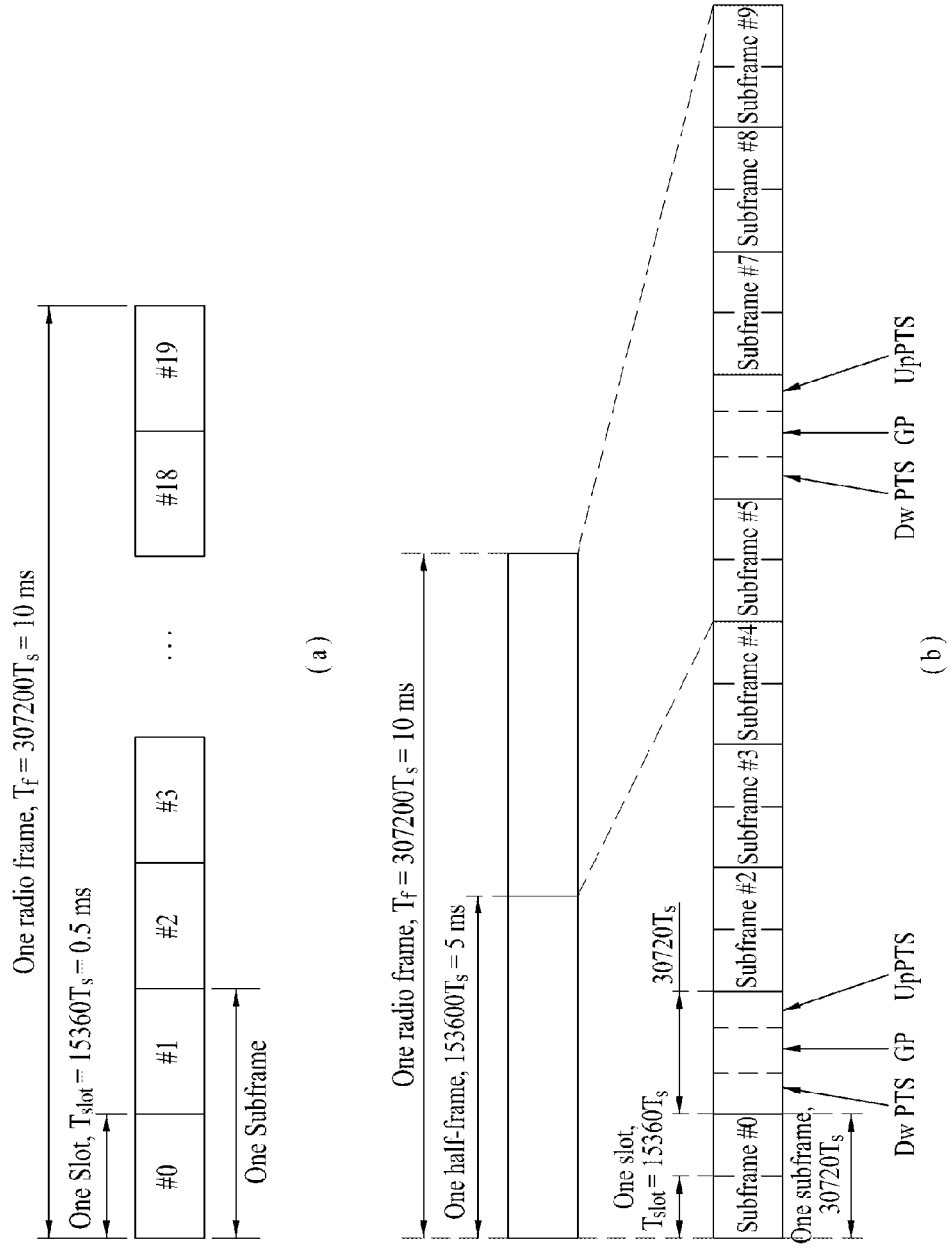
FIG. 1 exemplarily shows a radio frame structure for use in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Further, a technique, a device, and a system, which will be described hereinbelow, may be applied to various multiple access radio systems. For convenience, description will be given under the assumption that the present invention is applied to 3GPP LTE(-A). However, technical features of the present invention are not limited thereto. For example, although the following detailed description is given based on a 3GPP LTE(-A) mobile communication system, the present invention is applicable to other mobile communication systems except for matters that are specific to 3GPP LTE(-A).

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) denotes a fixed or mobile type terminal. Examples of the UE include various devices that transmit and receive user data and/or various kinds of control information to and from a base station. The UE may be referred to as a terminal equipment (TE), a mobile station (MS), a mobile terminal (MT), a user terminal (UT), a subscriber station (SS), a wireless device, a personal digital assistant (PDA), a wireless modem, or a handheld device. In addition, in the present invention, a base station (BS) means a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), or a processing server (PS).

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or Resource Elements (REs) carrying downlink control information (DCI), a set of time-frequency resources or REs carrying a control format indicator (CFI), a set of time-frequency resources or REs carrying downlink acknowledgement (ACK)/negative ACK (HACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present invention, in particular, a time-frequency resource or RE that is assigned to or belongs to PDCCH/PCFICH/PHICH/PDSCH/PUCCH/PUSCH is referred to as PDCCH/PCFICH/PHICH/PDSCH/PUCCH/PUSCH RE or PDCCH/PCFICH/PHICH/PDSCH/PUCCH/PUSCH time-frequency resource, respectively. Therefore, in the present invention, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of a BS is conceptually identical to downlink data/DCI transmission on PDCCH/PCFICH/PHICH/PDSCH, respectively.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. In addition, sounding reference signal (SRS) time-frequency resources (REs) refer to time-frequency resources (REs) carrying an SRS that is transmitted from a UE to a BS and is used by the BS for measurement of an uplink channel state formed between the UE and the BS. A reference signal (RS) refers to a predefined particular waveform of signal, known to the UE and the BS and is also referred to as a pilot.

In the meantime, in the present invention, a cell means a localized area where one BS, node(s) or antenna port(s) provides a communication service. Accordingly, in the present invention, communication with a specific cell may mean communication with a BS, node, or antenna port, which provides a communication service to the specific cell. Also, downlink/uplink signals of the specific ell mean downlink/uplink signals to a BS, node or antenna port, which provides a communication service to the specific cell. Moreover, channel status/quality of the specific cell means channel status/quality of a channel or communication link formed between the BS, node or antenna port, which provides a communication service to the specific cell, and the UE.

FIG. 1 illustrates the structure of a radio frame used in a wireless communication system. Specifically, FIG. 1(a) illustrates an exemplary structure of a radio frame which can be used in frequency division duplex (FDD) in 3GPP LTE(-A) and FIG. 1(b) illustrates an exemplary structure of a radio frame which can be used in time division duplex (TDD) in 3GPP LTE(-A).

Referring to FIG. 1, a 3GPP LTE(-A) radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15 \text{ kHz})$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission.

Figure 2:
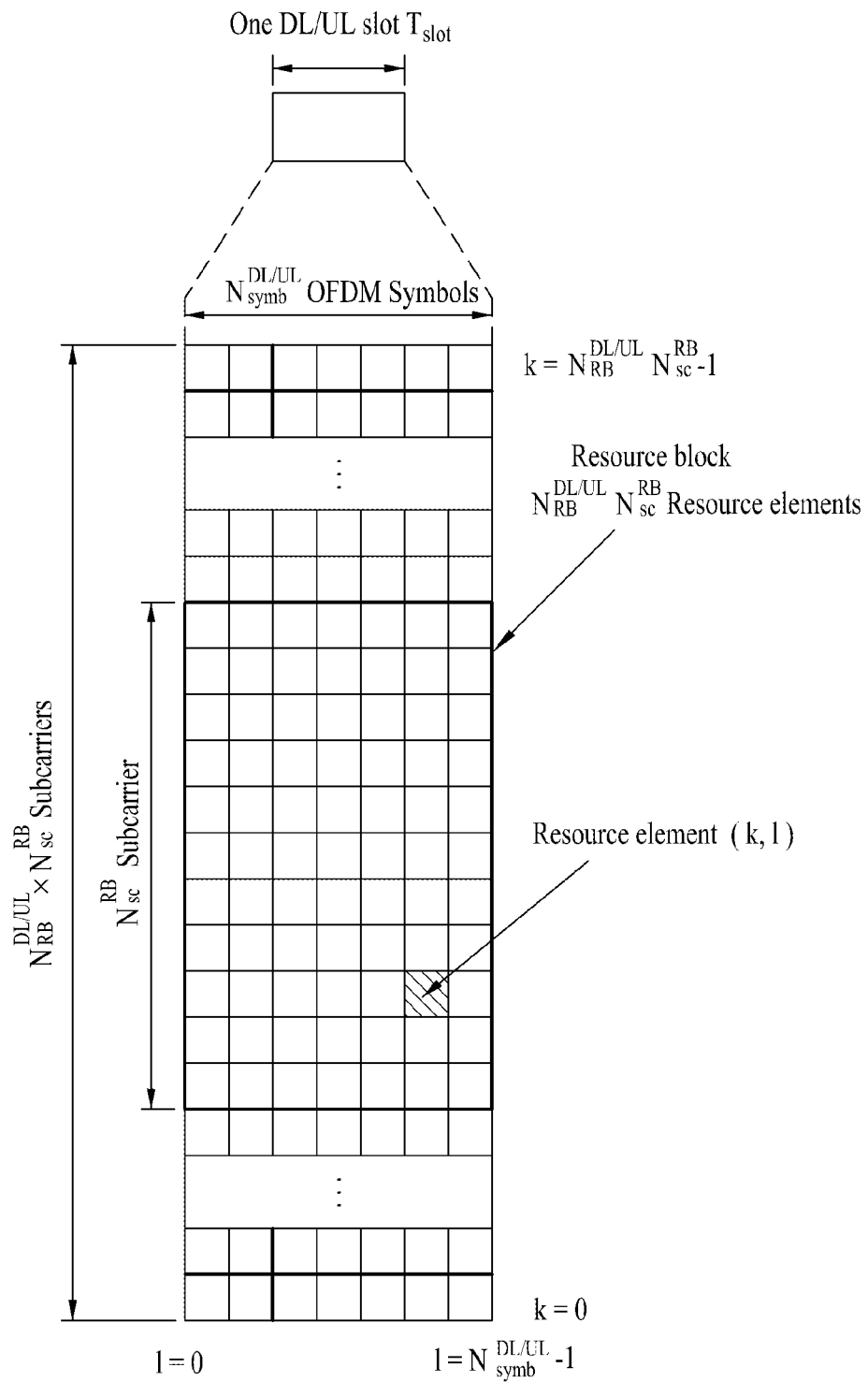
FIG. 2 exemplarily shows a downlink/uplink (DL/UL) slot structure for use in a wireless communication system.

FIG. 2 illustrates the structure of a DL/UL slot structure in a wireless communication system. In particular, FIG. 2 illustrates the structure of a resource grid of a 3GPP LTE(-A) system. One resource grid exists per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB} * N^{RB}_{sc}$ subcarriers and $N^{DL/DL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{DL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB} * N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to a resource element (RE) or tone. Accordingly, one RB includes $N^{DL/UL}_{symb} * N^{RB}_{sc}$ REs. Each RE within a resource grid may be uniquely defined by an index pair (k, l) within one slot. k is an index ranging from 0 to $N^{DL/UL}_{RB} * N^{RB}_{sc} - 1$ in the frequency domain, and l is an index ranging from 0 to $N^{DL/UL}_{symb} 1 - 1$ in the time domain.

In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index). A virtual resource block (VRB) is a logical resource allocation unit for resource allocation. The VRB has the same size as that of the PRB. A VRB may be classified into a localized VRB or a distributed VRB depending on a mapping mode of VRB into PRB. Localized VRBs are mapped directly to PRBs such that VRB number (VRB index) corresponds to PRB number. That is, $n_{PRB} = n_{VRB}$ is obtained. Localized VRBs are numbered from 0 to $N^{DL}_{VRB} - 1$, where $N^{DL}_{VRB} = N^{DL}_{RB}$. Accordingly, according to the localized mapping mode, VRBs having the same VRB number are mapped into PRBs having the same PRB number at the first slot and the second slot. On the other hand, distributed VRBs are mapped to PRBs via interleaving. Accordingly, VRBs having the same VRB number may be mapped into the PRBs having different PRB numbers at the first slot and the second slot. Two PRBs, which are respectively located at two slots of the subframe and have the same VRB number, will be referred to as VRB pair.

Figure 3:
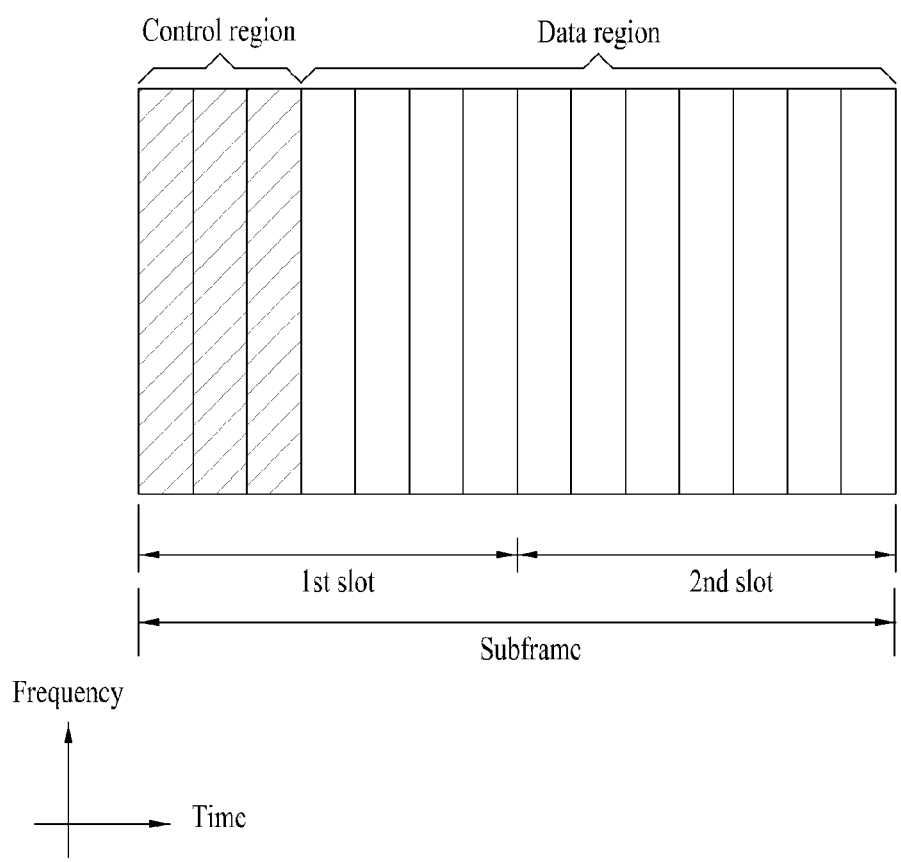
FIG. 3 exemplarily shows a downlink (DL) subframe structure for use in a 3GPP LTE/LTE-A system.

FIG. 3 is a diagram illustrating a structure of a downlink frame used in a 3GPP LTE(-A) system.

The downlink subframe is divided into a control region and a data region in a time domain. Referring to FIG. 3, maximum three (or four) OFDM symbols located at the front of the first slot of the subframe correspond to the control region to which a control channel is allocated. Hereinafter, a resource region available for PDCCH transmission for the downlink subframe will be referred to as a PDCCH region. The other OFDM symbols not the OFDM symbols used for the control region correspond to the data region to which a physical downlink shared channel (PDSCH) is allocated. Hereinafter, a resource region available for PDSCH transmission for the downlink subframe will be referred to as a PDSCH region. Examples of the downlink control channel used in the 3GPP LTE include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and carries information on the number of OFDM symbols used for transmission of the control channel within the subframe. The PHICH carries HARQ ACK/NACK (acknowledgement/negative-acknowledgement) signal in response to uplink transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate.

A plurality of PDCCHs may be transmitted within a control region. The UE may monitor the plurality of PDCCHs. The BS determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channel (that is, PDFICH and PHICH). The number of DCI formats and DCI bits is determined in accordance with the number of CCEs.

CCEs are numbered and used consecutively. In order to simplify a decoding process, the PDCCH having a format that includes n number of CCEs may only start on a CCE fulfilling a CCE number corresponding to a multiple of n. The number of CCEs used for transmission of a specific PDCCH is determined by the BS in accordance with a channel status. For example, one CCE may be required for a PDCCH for a UE (for example, adjacent to BS) having a good downlink channel. However, in case of a PDCCH for a UE (for example, located near the cell edge) having a poor channel, eight CCEs may be required to obtain sufficient robustness. Also, a power level of the PDCCH may be adjusted to correspond to a channel status.

Figure 4:
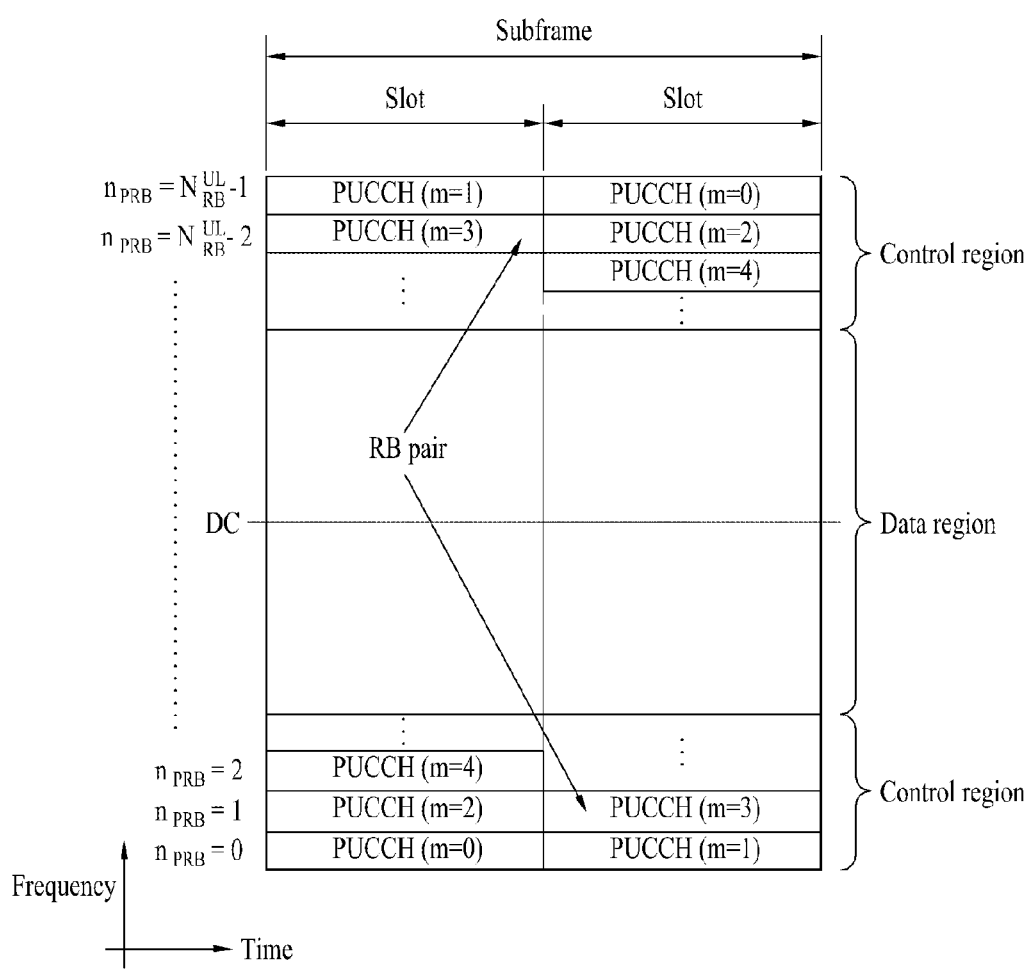
FIG. 4 exemplarily shows an uplink (UL) subframe for use in a 3GPP LTE/LTE-A system.

FIG. 4 illustrates the structure of a UL subframe used in a 3GPP LTE(-A) system.

Referring to FIG. 4, a UL subframe may be divided into a data region and a control region in the frequency domain. One or several PUCCHs may be allocated to the control region to deliver UCI. One or several PUSCHs may be allocated to the data region of the UL subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted on a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of a PUCCH and a PUSCH may be indicated by higher layers.

In the UL subframe, subcarriers distant from a direct current (DC) subcarrier are used as the control region. In other words, subcarriers located at both ends of a UL transmission bandwidth are used to transmit UL control information. A DC subcarrier is a component unused for signal transmission and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The PUCCH allocated as above will be expressed as that the pair of RBs allocated to the PUCCH is subjected to frequency hopping at the slot boundary. However, if frequency hopping is not applied to the RB pair, the RBs forming the RB pair occupy the same subcarriers at the two slots.

The size and usage of UCI carried by one PUCCH may be changed according to PUCCH format and the size of the UCI may be changed according to coding rate. For example, the following PUCCH format may be defined.

TABLE 2

| PUCCH format | Modulation scheme | Number of bits per subframe | Usage | Etc. |
| --- | --- | --- | --- | --- |
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codewords |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH format 1 series and PUCCH format 3 series are mainly used to transmit ACK/NACK information and PUCCH format 2 series is mainly used to carry channel state information (CSI) such as channel quality indicator (CQI)/precoding matrix indicator (PMI)/rank indicator (RI).

Figure 5:
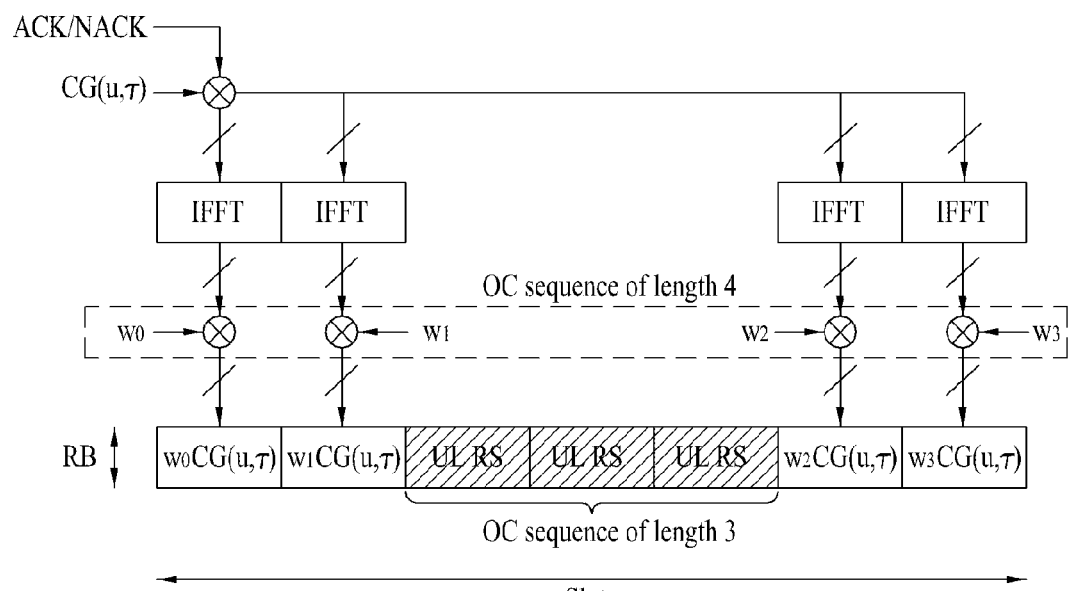
FIGS. 5 and 6 are conceptual diagrams illustrating UCI transmission based on PUCCH format.
Figure 6:
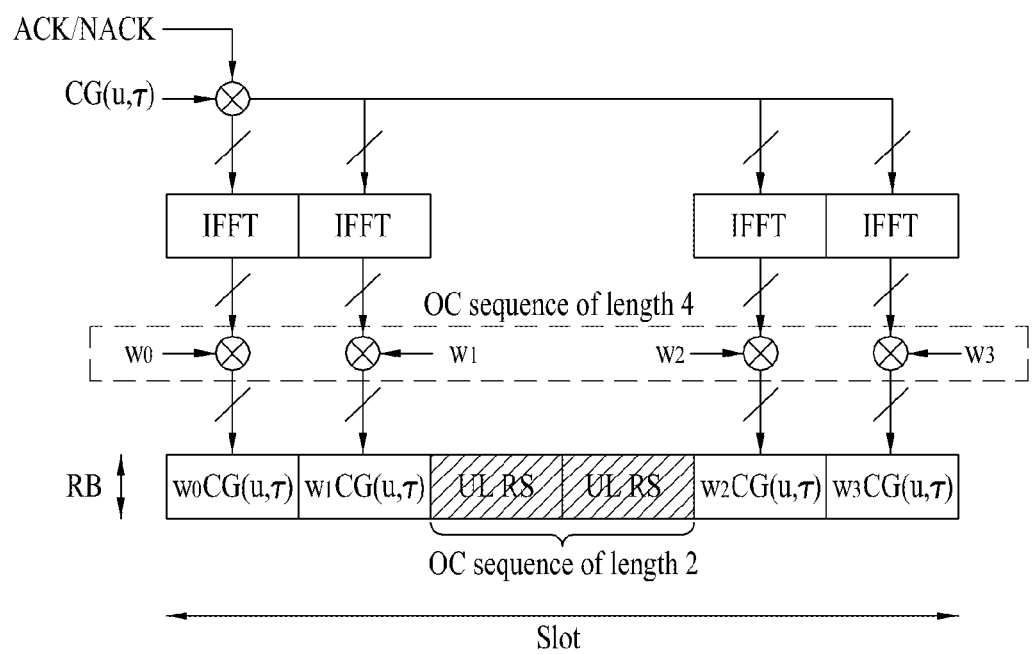

FIG. 5 to FIG. 6 exemplarily show UCI transmission according to PUCCH formats.

In a 3GPP LTE(-A) system, a DL/UL subframe with a normal CP consists of two slots each including 7 OFDM symbols and a DL/UL subframe with an extended CP consists of two slots each having 6 OFDM symbols. Since the number of OFDM symbols per subframe varies with CP length, a structure in which a PUCCH is transmitted in a UL subframe also varies with the CP length. Accordingly, a UCI transmission method of a UE in the UL subframe depends on a PUCCH format and the CP length.

FIG. 5 illustrates an example of transmitting ACK/NACK information using PUCCH format 1a/1b in a UL slot with a normal CP and FIG. 6 illustrates an example of transmitting ACK/NACK information using PUCCH format 1a/1b in a UL slot with an extended CP.

Referring to FIGS. 5 and 6, control information transmitted using PUCCH formats 1a and 1b is repeated with the same contents on a slot basis in a subframe. In each UE, ACK/NACK signals are transmitted on different resources which are configured with different cyclic shifts (CSs) (frequency domain codes) of a computer-generated constant amplitude zero autocorrelation (CG-CAZAC) sequence and orthogonal covers (OCs) or orthogonal cover codes (OCCs) (time domain spread codes). An OCC is also referred to as an orthogonal sequence. An OC includes, for example, a Walsh/DFT OC. Provided that the number of CSs is 6 and the number of OCs is 3, a total of 18 PUCCHs may be multiplexed in the same physical resource block (PRB) based on a single antenna port. Orthogonal sequences $w_0$, $w_1$, $w_2$ and $w_3$ may be applied in either an arbitrary time domain (after FFT modulation) or an arbitrary frequency domain (before FFT modulation). In the 3GPP LTE(-A) system, a PUCCH resource for ACK/NACK transmission is expressed as a combination of the position of a time-frequency resource (e.g. PRB), a CS of a sequence for frequency spreading, and an (quasi) OC for time spreading and each PUCCH resource is indicated using a PUCCH resource index (also referred to as a PUCCH index). A PUCCH format 1 series for scheduling request (SR) transmission is the same in a slot level structure as PUCCH format 1a and 1b and differs only in a modulation method from the PUCCH formats 1a and 1b.

FIGS. 7 to 10 exemplarily show a PUCCH format 3 and associated signal processing according to the embodiments of the present invention. Particularly, FIGS. 7 to 9 exemplarily show the DFT-based PUCCH format structure. According to the DFT-based PUCCH structure, DFT precoding is performed in PUCCH and a time domain orthogonal cover (OC) is applied to the PUCCH at SC-FDMA level before the PUCCH is transmitted. The DFT-based PUCCH format is generically named as a PUCCH format 3.

Figure 7:
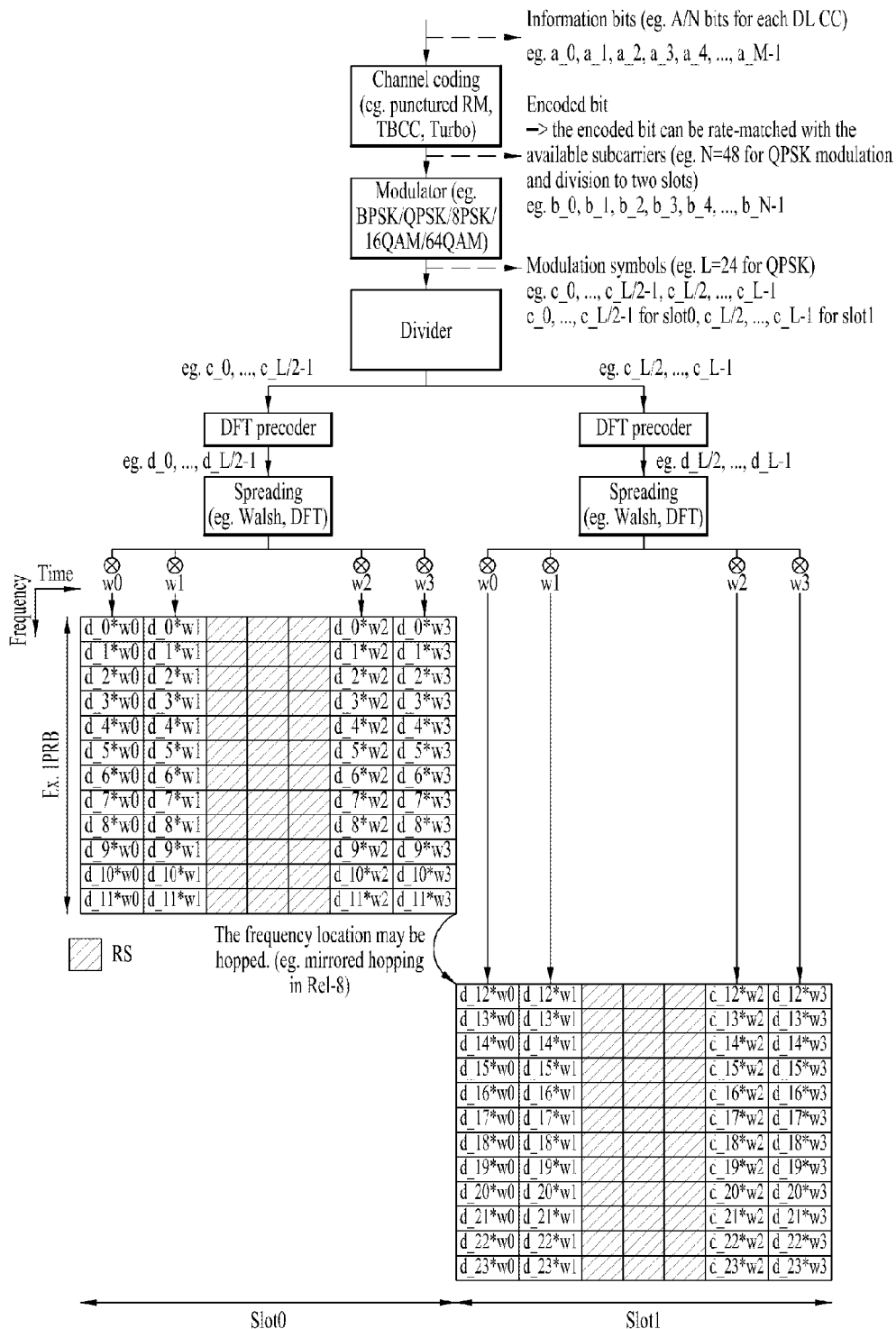
FIGS. 7 to 10 are conceptual diagrams illustrating a PUCCH format 3 structure and signal processing for the same.

FIG. 7 exemplarily shows the PUCCH format 3 structure using the orthogonal code (OC) of SF=4. Referring to FIG. 25, the channel coding block performs channel coding of the information bits ($a\_0, a\_1, \ldots, a\_M-1$) (e.g., multiple ACK/NACK bits), thereby generating the encoded bits (coded bit or coding bit)(or codeword) ($b\_0, b\_1, \ldots, b\_N-1$). M is the size of information bit, and N is the size of coding bit. The information bit may include UCI, for example, multiple ACK/NACK data for multiple data units (or PDSCHs) received through multiple DL CCs. In this case, the information bit ($a\_0, a\_1, \ldots, a\_M-1$) is joint-coded irrespective of categories/numbers/sizes of UCIs constructing the information bit. For example, if the information bit includes multiple ACK/NACK data of several DL CCs, the channel coding is not performed per DL CC or per ACK/NACK bit, but performed for the entire bit information, such that a single codeword is generated. The channel coding is not limited thereto, and includes simple repetition, simplex coding, Reed Muller (RM) coding, punctured RM coding, Tail-biting convolutional coding (TBCC), low-density parity-check (LDPC) or turbo-coding. Although not shown in the drawings, the coding bit may be rate-matched in consideration of a modulation order and the amount of resources. The rate matching function may be included in some parts of the channel coding block or may be performed through a separate functional block. For example, the channel coding block may perform the (32,0) RM coding for several control information to obtain a single codeword, and cyclic buffer rate-matching for the obtained codeword may be performed.

The modulator modulates the coding bit ($b\_0, b\_1, \ldots, b\_N-1$) so as to generate the modulation symbol ($c\_0, c\_1, \ldots, c\_L-1$). L is the size of a modulation symbol. The modulation method may be performed by modifying the size and phase of a transmission (Tx) signal. For example, the modulation method may include n-PSK (Phase Shift Keying), n-QAM (Quadrature Amplitude Modulation) (where n is an integer of 2 or higher). In more detail, the modulation method may include BPSK (Binary PSK), QPSK (Quadrature PSK), 8-PSK, QAM, 16-QAM, 64-QAM, etc.

The divider distributes the modulation symbols ($c\_0, c\_1, \ldots, c\_L-1$) to individual slots. The order/pattern/scheme for distributing the modulation symbols to individual slots may not be specially limited. For example, the divider may sequentially distribute the modulation symbols to individual slots (i.e., localized scheme). In this case, as shown in the drawings, the modulation symbols ($c\_0, c\_1, \ldots, c\_L/2-1$) are distributed to Slot 0, the modulation symbols ($c\_L/2, c\_L/2+1, \ldots, c\_L-1$) may be distributed to Slot 1. In addition, the modulation symbols may be interleaved (or permuted) while being distributed to individual slots. For example, the even-th modulation symbols may be distributed to Slot 0, and the odd-th modulation symbols may be distributed to Slot 1. If necessary, the modulation process and the distribution process may be replaced with each other in order.

The DFT precoder performs DFT precoding (e.g., 12-point DFT) for the modulation symbols distributed to individual slots so as to generate a single carrier waveform. Referring to FIG. 25, the modulation symbols ($c\_0, c\_1, \ldots, c\_L/2-1$) distributed to Slot 0 may be DFT-precoded to DFT symbols ($d\_0, d\_1, \ldots, d\_L/2-1$), ad the modulation symbols ($c\_L/2, c\_L/2+1, \ldots, c\_L-1$) distributed to Slot 1 may be DFT-precoded to DFT symbols ($d\_L/2, d\_L/2+1, \ldots, d\_L-1$). The DFT precoding may be replaced with another linear operation (e.g., Walsh precoding).

The spreading block performs spreading of the DFT-processed signal at the SC-FDMA symbol level. The time domain spreading at the SC-FDMA symbol level may be performed using the spreading code (sequence). The spreading code may include a Quasi-orthogonal code and an orthogonal code. The Quasi-orthogonal code is not limited thereto, and may include a PN (Pseudo Noise) code as necessary. The orthogonal code is not limited thereto, and may include a Walsh code, a DFT code, etc. as necessary. Although the present embodiment is focused only upon the orthogonal code as a representative spreading code for convenience of description, the orthogonal code may be replaced with a Quasi-orthogonal code. A maximum value of the spreading code size (or the spreading factor (SF)) is limited by the number of SC-FDMA symbols used for control information transmission. For example, if four SC-FDMA symbols are used to transmit control information in one slot, orthogonal codes (w0, w1, w2, w3) each having the length of 4 may be used in each slot. SF means the spreading degree of control information, and may be relevant to the UE multiplexing order or antenna multiplexing order. SF may be changed according to system requirements, for example, in the order of 1, 2, 3, 4, . . . . The SF may be pre-defined between the BS and the UE, or may be notified to the UE through DCI or RRC signaling. For example, if one of SC-FDMA symbols for control information is punctured to achieve SRS transmission, the SF-reduced spreading code (e.g., SF=3 spreading code instead of SF=4 spreading code) may be applied to control information of the corresponding slot.

The signal generated through the above-mentioned process may be mapped to subcarriers contained in the PRB, IFFT-processed, and then converted into a time domain signal. The CP may be added to the time domain signal, and the generated SC-FDMA symbol may be transmitted through the RF unit.

Detailed description of individual process on the assumption that ACK/NACK for 5 DL CCs is transmitted will hereinafter be described. If each DL CC transmits two PDSCHs, associated ACK/NACK data includes a DTX state, and the ACK/NACK data may be composed of 12 bits. Assuming that QPSK modulation and 'SF=4' time spreading are used, the coding block size (after the rate matching) may be composed of 48 bits. The coding bit may be modulated into 24 QPSK symbols, and 12 QPSK symbols are distributed to each slot. In each slot, 12 QPSK symbol may be converted into 12 DFT symbols through the 12-point DFT operation. 12 DFT symbols in each slot may be spread and mapped to four SC-FDMA symbols using the SF=4 spreading code in a time domain. Since 12 bits are transmitted through [2 bits*12 subcarriers*8 SC-FDMA symbols], the coding rate is set to 0.0625(=12/192). In case of SF=4, a maximum of four UEs may be multiplexed to one PRB.

Figure 8:
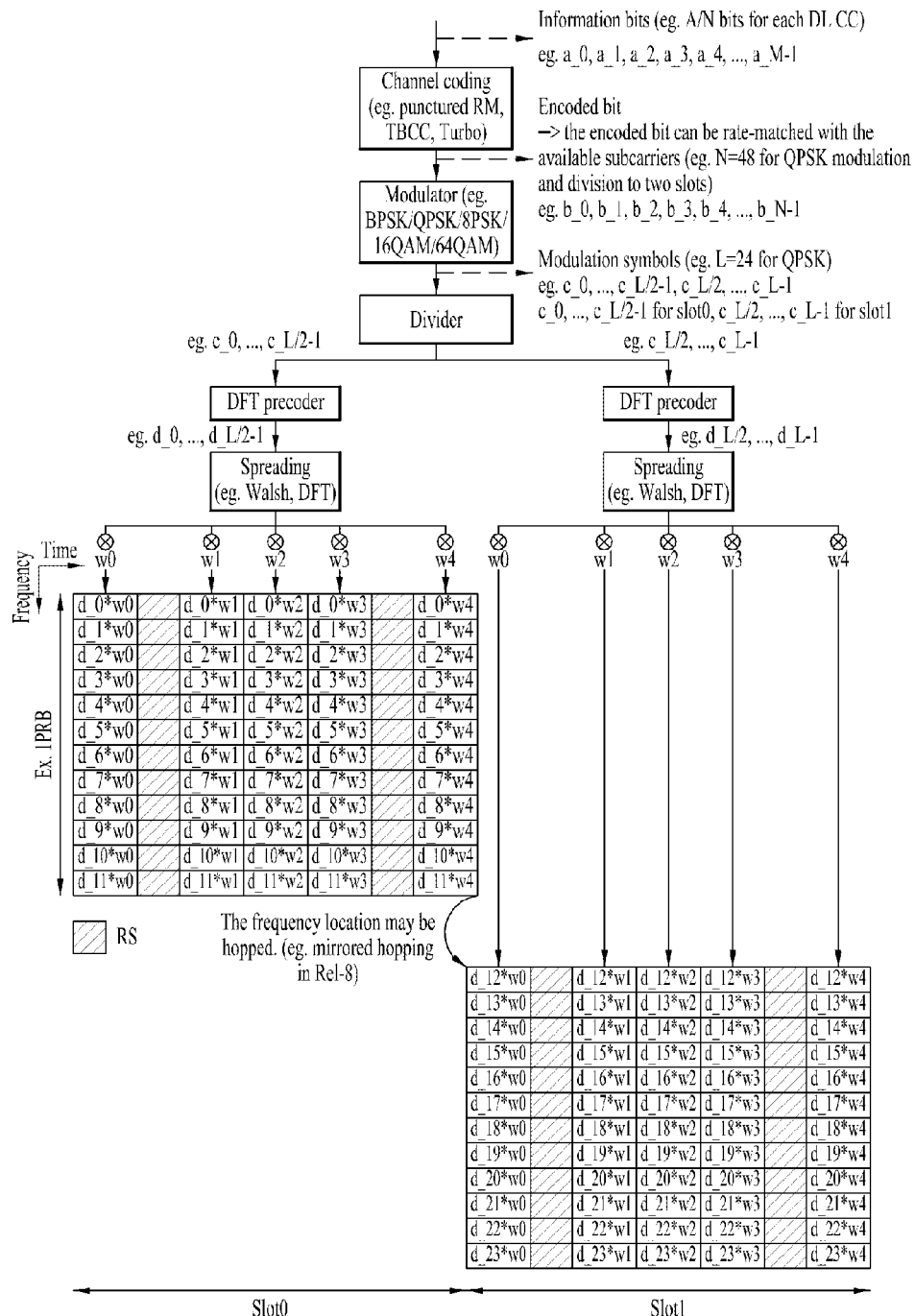

FIG. 8 exemplarily shows the PUCCH format 3 structure using the orthogonal code (OC) of SF=5.

The basic signal processing of FIG. 8 is identical to that of FIG. 7. Compared to FIG. 7, the number/position of UCI SC-FDMA symbols and the number/position of RS SC-FDMA symbols shown in FIG. 8 are different from those of FIG. 7. In this case, the spreading block may also be pre-applied to the previous stage of the DFT precoder as necessary.

In FIG. 8, the RS may succeed to the LTE system structure. For example, cyclic shift (CS) may be applied to a basic sequence. Since the data part includes SF=5, the multiplexing capacity becomes 5. However, the multiplexing capacity of the RS part is determined according to a cyclic shift (CS) interval ($\Delta_{shift}^{PUCCH}$). For example, the multiplexing capacity is given as $12/\Delta_{shift}^{PUCCH}$. In case of $\Delta_{shift}^{PUCCH}=1$, the multiplexing capacity is set to 12. In case of $\Delta\Delta_{shift}^{PUCCH}=2$, the multiplexing capacity is set to 6. In case of $\Delta_{shift}^{PUCCH}=3$, the multiplexing capacity is set to 4. In FIG. 8, while the multiplexing capacity of the data part is set to 5 because of SF=5, the RS multiplexing capacity is set to 4 in case of $\Delta_{shift}^{PUCCH}$, such that the resultant multiplexing capacity may be limited to 4 corresponding shift to the smaller one of two capacity values 5 and 4.

Figure 9:
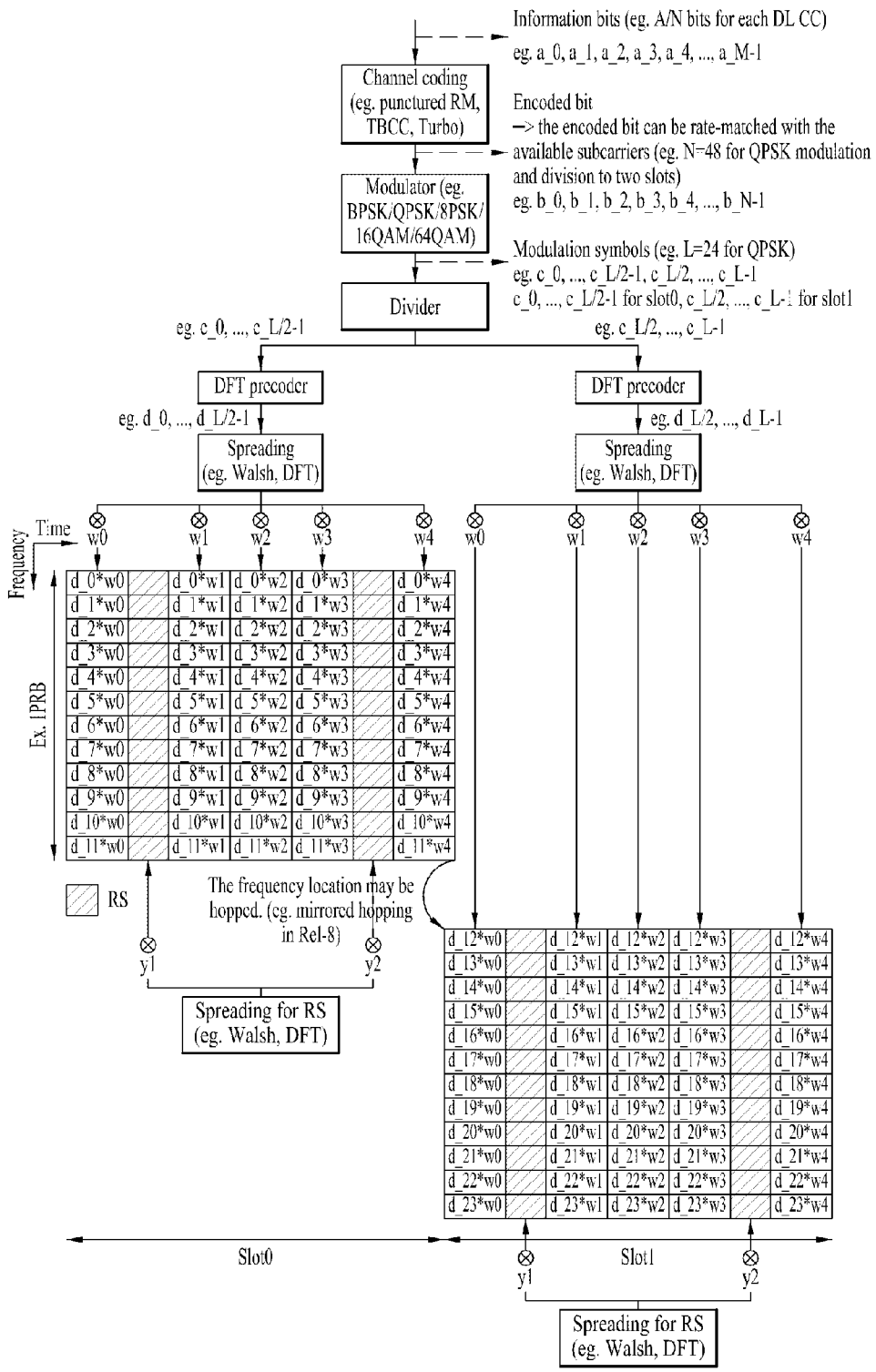

FIG. 9 exemplarily shows the PUCCH format 3 structure in which the multiplexing capacity is increased at a slot level.

The SC-FDMA symbol level spreading illustrated in FIGS. 7 and 8 is applied to RS, resulting in increase in the entire multiplexing capacity. Referring to FIG. 9, if a Walsh cover (or DFT code cover) is applied in the slot, the multiplexing capacity is doubled. Therefore, even in the case of $\Delta_{shift}^{PUCCH}$, the multiplexing capacity is set to 8, such that the multiplexing capacity of the data section is not decreased. In FIG. 9, [y1 y2]=[1 1] or [y1 y2]=[1 −1], or linear conversion format (e.g., [j j] [j−j], [1 j] [1−j], or the like) may also be used as an orthogonal cover code for RS.

Figure 10:
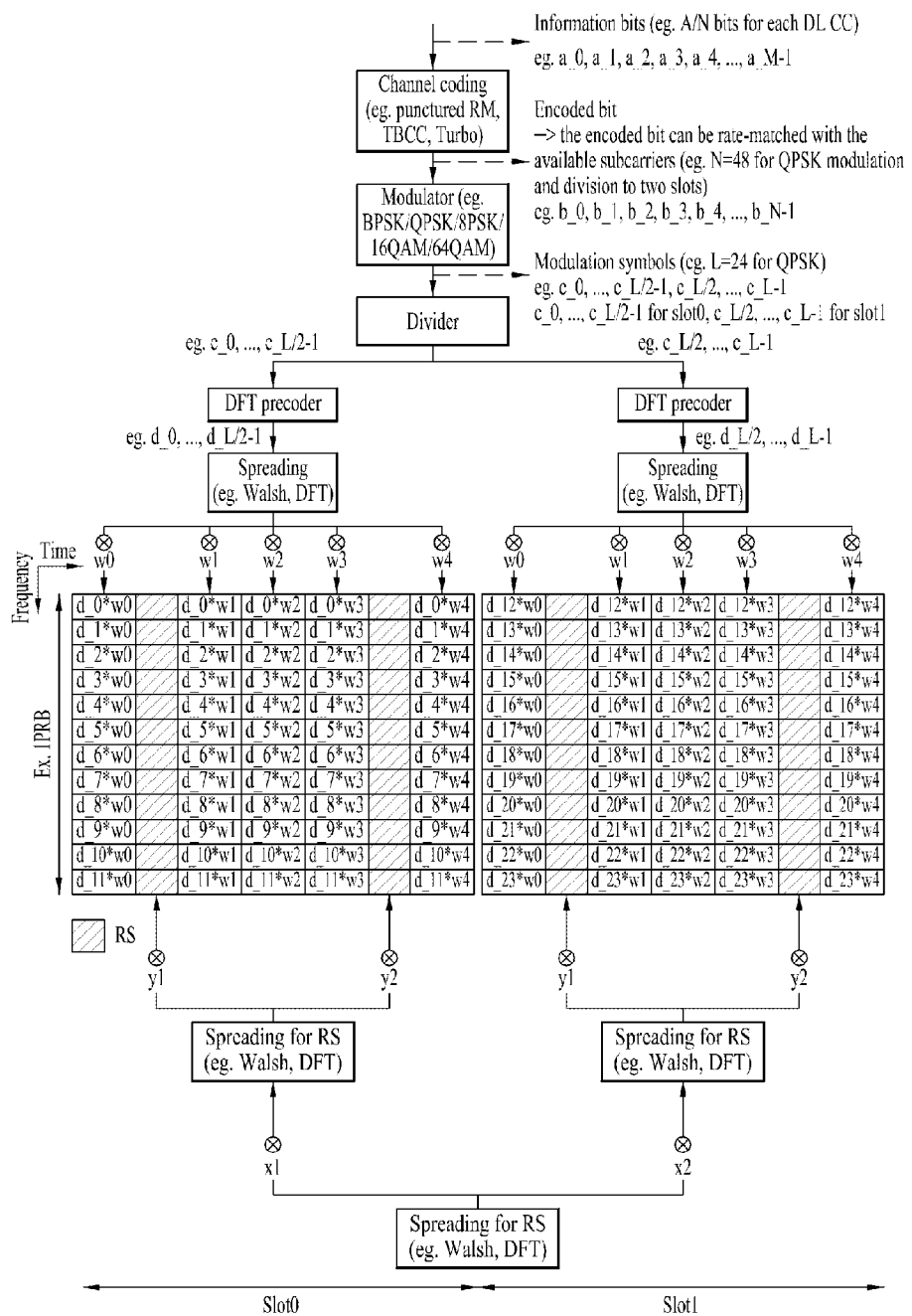

FIG. 10 exemplarily shows a PUCCH format 3 structure in which the multiplexing capacity can be increased at a subframe level.

If the frequency hopping is not applied to the slot level, the Walsh cover is applied in slot units, and the multiplexing capacity may be re-increased two times. In this case, as previously stated above, [x1 x2]=[1 1] or [1 −1] may be used as the orthogonal cover code, and its modification format may also be used as necessary.

For reference, the PUCCH format 3 processing may be free of the orders shown in FIGS. 7 to 10.

Multiple carriers in carrier aggregation may be classified into PCell and SCell(s). The UE may accumulate responses to one or more PDCCHs and/or PDSCH having no PDCCH received on a DL PCell and/or DL SCell(s), and may transmit the accumulated responses on a PUCCH using a UL PCell. In this way, subframe(s) and/or CC(s) carrying a plurality of PDCCHs of which corresponding responses are transmitted through one UL PUCCH may be referred to as a bundling window. Although the time domain or the CC domain bundling described in the present embodiment may indicate the logical AND operation, it may also be performed through another method such as the logical OR operation, etc. That is, the time domain or the CC domain bundling may be a generic term of a variety of methods for representing a plurality of ACK/NACK parts covering several subframes or several CCs in the ACK/NACK response using a single PUCCH format. That is, X-bit ACK/NACK information may generically represent an arbitrary method for expressing X-bit ACK/NACK information using Y-bits (where X≥Y). For example, the CC domain bundling is a scheme where the ACK/NACK response to the all DL subframes in the CC domain is set to "ACK" only if all ACK/NACK responses in the CC domain are ACK, otherwise the ACK/NACK response to the all DL subframes in the CC domain is set to "NACK/DTX," so that the number of ACK/NACK responses can be reduced.

In the CA TDD, multiple ACK/NACK responses for each CC may be transmitted by channel selection using the PUCCH format 1a/1b or by another channel selection using PUCCH format 3 or by PUCCH format 3. Implicit mapping or explicit mapping may be applied to the PUCCH resource index for the above-mentioned PUCCH formats, or a combination of the implicit mapping and the explicit mapping may also be applied thereto as necessary. For example, the implicit mapping may be used as a method for deriving a PUCCH resource index on the basis of the lowest CCE index of the corresponding PDCCH. For example, the explicit mapping may be used as a method for indicating or deriving the corresponding PUCCH resource index from among predetermined sets according to the RRC structure by the ACK/NACK Resource Indicator (ARI) value contained in the corresponding PDCCH.

Cases in which ACK/NACK feedback for DL is needed in a subframe n can be largely classified into the following three cases (Case 1, Case 2, Case 3).

Case 1: ACK/NACK feedback is needed for PDSCH(s) indicated by PDCCH(s) detected at the subframe(s) (n−k). In this case, K is denoted by (k∈K), K is changed according to the subframe index (n) and UL-DL structure, and is comprised of M elements $\{k_0, k_1, \ldots k_{M-1}\}$. Table 3 shows K composed of M elements $\{k_0, k_1, \ldots k_{M-1}\}$ (i.e., K: $\{k_0, k_1, \ldots k_{M-1}\}$). Case 1 relates to PDSCH(s), each of which requires general ACK/NACK feedback. In the following description, Case 1 is referred to as 'ACK/NACK for PDSCH with PDCCH'.

Case 2: ACK/NACK feedback is needed for PDCCH(s) indicating DL SPS (Semi-Persistent Scheduling) release in subframe(s) (n−k). In this case, K is denoted by (k∈K), and K is identical to that of Case 1. The ACK/NACK of Case 2 may indicate ACK/NACK feedback for PDCCH(s) for SPS release. In contrast, although ACK/NACK feedback for DL SPS release is performed, ACK/NACK feedback for PDCCH(s) indicating SPS activation is not performed. In the following description, Case 2 is referred to as 'ACK/NACK for DL SPS release'.

Case 3: ACK/NACK feedback is needed for transmission of PDSCH(s) having no PDCCH(s) detected at the subframe(s) n−k. In this case, K is denoted by (k∈K), and K is identical to that of Case 1. Case 3 relates to PDSCH(s) without PDCCH(s), and may indicate ACK/NACK feedback for SPS PDSCH(s). In the following description, Case 3 is referred to as 'ACK/NACK for DL SPS'.

In the following description, the above-mentioned PDSCHs and PDCCHs, each of which requires the ACK/NACK feedback, may be generically named as DL allocation or DL transmission.

TABLE 3

Downlink association set index Configuration K: $\{k_0, k_1, \ldots k_{M-1}\}$ for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In case of the FDD, M is always set to 1, and K is denoted by $(\{k_0\} = \{4\})$.

The ACK/NACK channel selection may indicate the ACK/NACK channel selection scheme for employing implicit resources (linked to the lowest CCE index) corresponding to a PDSCH scheduling each PDSCH of the corresponding UE so as to guarantee PUCCH resources of each UE. The ACK/NACK channel selection scheme will hereinafter be described with reference to Table 4.

TABLE 4

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, ACK, ACK | $n^{(1)}_{PUCCH,1}$ | 1, 1 |
| ACK, ACK, ACK, NACK/DTX | $n^{(1)}_{PUCCH,1}$ | 1, 0 |
| NACK/DTX, NACK/DTX, NACK, DTX | $n^{(1)}_{PUCCH,2}$ | 1, 1 |

TABLE 4-continued

| HARQ-ACK(0), HARQ-ACK(1), HARQ-ACK(2), HARQ-ACK(3) | $n^{(1)}_{PUCCH}$ | b(0), b(1) |
|---|---|---|
| ACK, ACK, NACK/DTX, ACK | $n^{(1)}_{PUCCH,1}$ | 1, 0 |
| NACK, DTX, DTX, DTX | $n^{(1)}_{PUCCH,0}$ | 1, 0 |
| ACK, ACK, NACK/DTX, NACK/DTX | $n^{(1)}_{PUCCH,1}$ | 1, 0 |
| ACK, NACK/DTX, ACK, ACK | $n^{(1)}_{PUCCH,3}$ | 0, 1 |
| NACK/DTX, NACK/DTX, NACK/DTX, NACK | $n^{(1)}_{PUCCH,3}$ | 1, 1 |
| ACK, NACK/DTX, ACK, NACK/DTX | $n^{(1)}_{PUCCH,2}$ | 0, 1 |
| ACK, NACK/DTX, NACK/DTX, ACK | $n^{(1)}_{PUCCH,0}$ | 0, 1 |
| ACK, NACK/DTX, NACK/DTX, NACK/DTX | $n^{(1)}_{PUCCH,0}$ | 1, 1 |
| NACK/DTX, ACK, ACK, ACK | $n^{(1)}_{PUCCH,3}$ | 0, 1 |
| NACK/DTX, NACK, DTX, DTX | $n^{(1)}_{PUCCH,1}$ | 0, 0 |
| NACK/DTX, ACK, ACK, NACK/DTX | $n^{(1)}_{PUCCH,2}$ | 1, 0 |
| NACK/DTX, ACK, NACK/DTX, ACK | $n^{(1)}_{PUCCH,3}$ | 1, 0 |
| NACK/DTX, ACK, NACK/DTX, NACK/DTX | $n^{(1)}_{PUCCH,1}$ | 0, 1 |
| NACK/DTX, NACK/DTX, ACK, ACK | $n^{(1)}_{PUCCH,3}$ | 0, 1 |
| NACK/DTX, NACK/DTX, ACK, NACK/DTX | $n^{(1)}_{PUCCH,2}$ | 0, 0 |
| NACK/DTX, NACK/DTX, NACK/DTX, ACK | $n^{(1)}_{PUCCH,3}$ | 0, 0 |
| DTX, DTX, DTX, DTX | N/A | N/A |

In Table 4, HARQ-ACK(i) (i=0, 1, 2, 3) may indicate the ACK/NACK result of a data unit (i). The data unit (i) may indicate a data that requires ACK/NACK. For example, the data unit (i) may indicate each CCE. $n^{(1)}_{PUCCH}$ may denote PUCCH resources to be used for actual ACK/NACK transmission. In Table 4, a total of 4 PUCCH resources (i.e., $n^{(1)}_{PUCCH,0}$, $n^{(1)}_{PUCCH,1}$, $n^{(1)}_{PUCCH,2}$, $n^{(1)}_{PUCCH,3}$) are used. b(0), b(1) may indicate two bits to be transferred by the selected PUCCH resources. ACK/NACK for a total of four data units may exemplarily show a total of 20 cases. The 20 cases may be mapped to the corresponding values b(0),b(1) in each PUCCH resource, and the mapped result may be transmitted. This scheme may correspond to the ACK/NACK channel selection.

Figure 11:
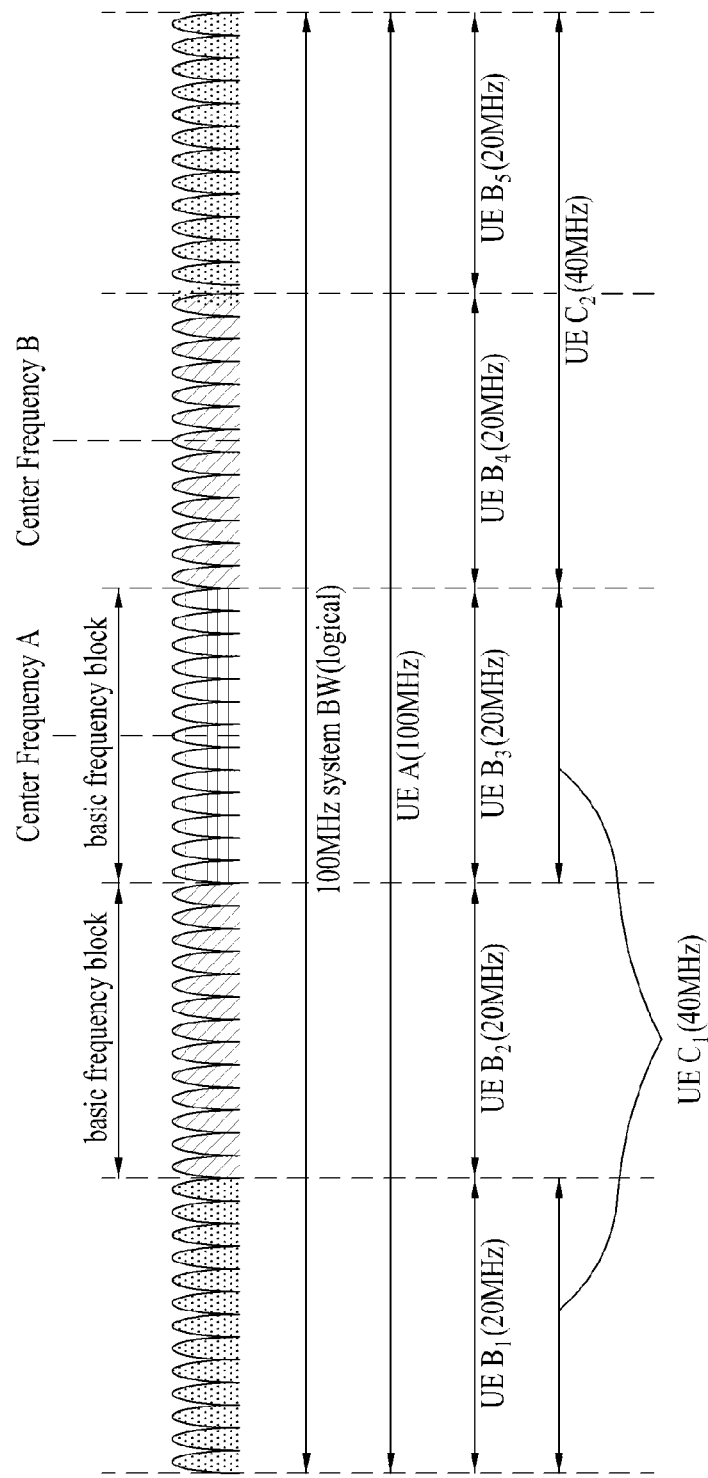
FIG. 11 is a conceptual diagram illustrating a carrier aggregation (CA) scheme.

Carrier aggregation will hereinafter be described in detail. FIG. 11 exemplarily shows carrier aggregation.

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Referring to FIG. 11, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 11, this is only exemplary and the CCs may have different bandwidths. Although the CCs are shown as being contiguous in the frequency domain in FIG. 8, FIG. 8 merely shows the logical concept and thus the CCs may be physically contiguous or separated.

Different center frequencies may be used for the CCs or one common center frequency may be used for physically contiguous CCs. For example, in FIG. 11, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or non-contiguous. The UE $C_1$ uses two non-contiguous CCs and the UE $C_2$ uses two contiguous CCs.

One downlink CC and one uplink CC may be used in the LTE system and several CCs may be used in the LTE-A system. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

Figure 12:
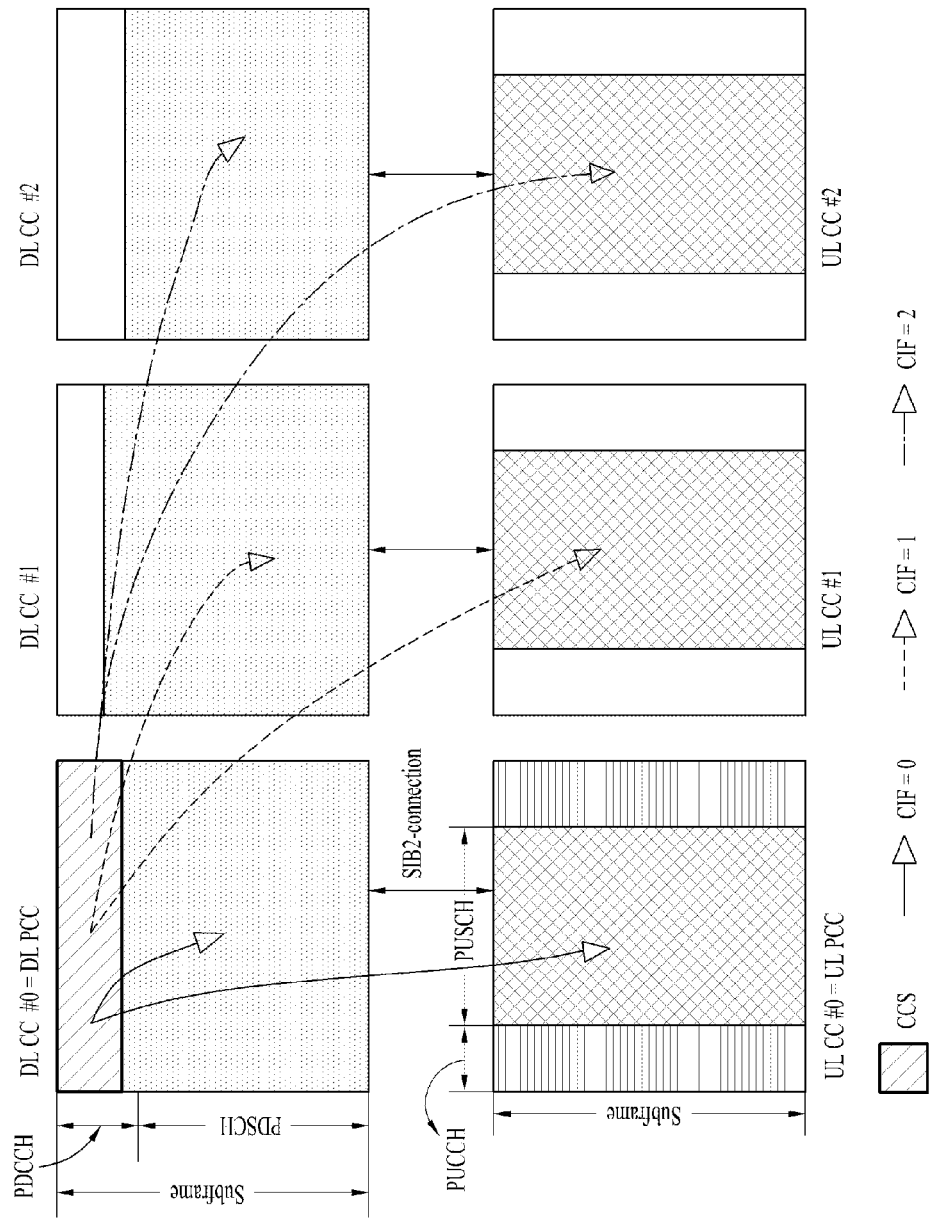
FIG. 12 is a conceptual diagram illustrating a cross-carrier scheduling scheme.

FIG. 12 is a conceptual diagram of a cross carrier scheduling scheme. Specifically, as can be seen from FIG. 12, the number of cells (or CCs) allocated to a relay node (RN) is set to 3, cross carrier scheduling is carried out using a CIF as described above. In this case, it is assumed that a downlink cell (or CC) #A is set to a primary downlink CC (i.e., a primary cell PCell), and the remaining CCs #B and #C are used as secondary cells (SCells).

Many developers and companies associated with the LTE-A system are conducting intensive research into the enhanced Inter Cell Interference Coordination (eICIC) for reducing interference between a first eNB (eNB1) and a second eNB (eNB2) in a heterogeneous network (HetNet) of the LTE-A system. A representative example thereof is an almost blank subframe (ABS), and it is possible to transmit only a CRS within a subframe designated as the ABS. In addition, Primary Synchronization Sequence (PSS), Secondary Synchronization Sequence (SSS), Physical Broadcast Control Channel (PBCH), System Information Block Type 1 (SIB1), Paging, Positioning Reference Signal (PRS), etc. may also be transmitted to the ABS.

In a heterogeneous network structure for use in the LTE-A system, a macro-cell-to-a femto-cell, a macro-cell-to-a pico-cell, etc. may be present. It is assumed that no information is exchanged through an X2 interface indicating an inter-cell interface in the macro-cell-to-the femto-cell, and it is assumed that no information is exchanged through an X2 interface in the macro-cell-to-the pico-cell. For example, the macro cell may inform the pico cell of the ABS configuration information through the X2 interface.

A Coordinated Multi-Point (CoMP) transmission and reception scheme will hereinafter be described in detail.

CoMP transmission/reception scheme (which is also referred to as co-MIMO, collaborative MIMO or network MIMO) is proposed to meet enhanced system performance requirements of 3GPP LTE-A. CoMP can improve the performance of a UE located at a cell edge and increase average sector throughput.

In a multi-cell environment having a frequency reuse factor of 1, the performance of a UE located at a cell edge and average sector throughput may decrease due to inter-cell interference (ICI). To reduce ICI, a conventional LTE system uses a method for allowing a UE located at a cell edge in an interfered environment to have appropriate throughput using a simple passive scheme such as fractional frequency reuse (FFR) through UE-specific power control. However, it may be more preferable to reduce ICI or reuse ICI as a signal that a UE desires rather than decreasing frequency resource use per cell. To achieve this, CoMP can be applied.

CoMP applicable to downlink can be classified into joint processing (JP) and coordinated scheduling/beamforming (CS/CB).

According to the JP, each point (eNB) of a CoMP coordination unit can use data. The CoMP coordination unit refers to a set of eNBs used for a coordinated transmission scheme. The JP can be divided into joint transmission and dynamic cell selection.

The joint transmission refers to a scheme through which PDSCHs are simultaneously transmitted from a plurality of points (some or all CoMP coordination units). That is, data can be transmitted to a single UE from a plurality of transmission points. According to joint transmission, quality of a received signal can be improved coherently or non-coherently and interference on other UEs can be actively erased.

Dynamic cell selection refers to a scheme by which a PDSCH is transmitted from one point (in a CoMP coordination unit). That is, data is transmitted to a single UE from a single point at a specific time, other points in the coordination unit do not transmit data to the UE at the time, and the point that transmits the data to the UE can be dynamically selected.

According to the CS/CB scheme, CoMP coordination units can collaboratively perform beamforming of data transmission to a single UE. Here, user scheduling/beaming can be determined according to coordination of cells in a corresponding CoMP coordination unit although data is transmitted only from a serving cell.

In case of uplink, coordinated multi-point reception refers to reception of a signal transmitted according to coordination of a plurality of points geographically spaced apart from one another. A CoMP reception scheme applicable to uplink can be classified into joint reception (JR) and coordinated scheduling/beamforming (CS/CB).

JR is a scheme by which a plurality of reception points receives a signal transmitted over a PUSCH and CS/CB is a scheme by which user scheduling/beamforming is determined according to coordination of cells in a corresponding CoMP coordination unit while one point receives a PUSCH.

In addition, in the case in which several UL points (i.e., several Rx points) are present, this case is referred to as UL CoMP. In the case in which several DL points (i.e., several Tx points) are present, this case is referred to as DL CoMP.

Figure 13:
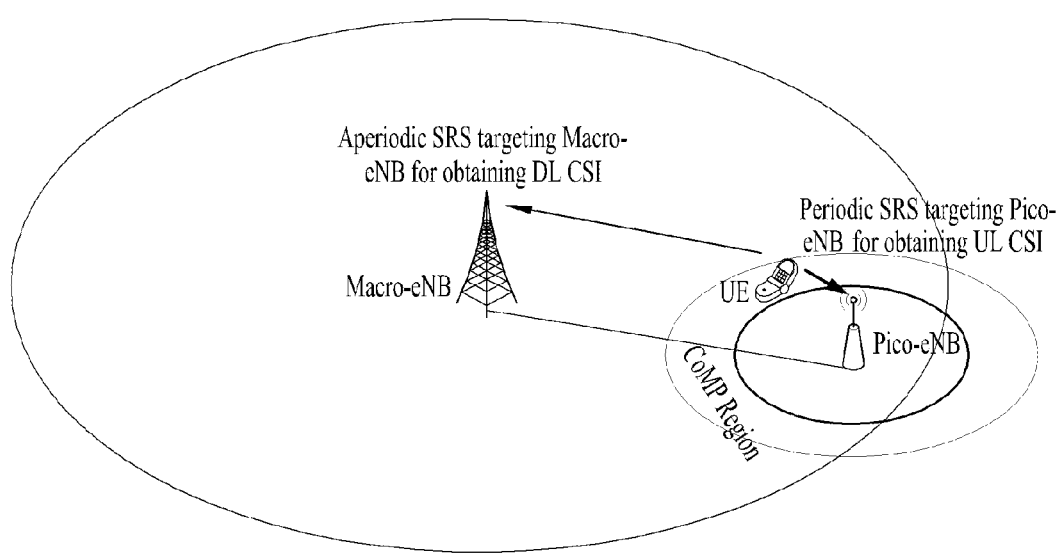
FIG. 13 is a conceptual diagram illustrating a wireless communication environment according to the embodiments of the present invention.

FIG. 13 is a conceptual diagram illustrating a wireless communication environment according to the embodiments of the present invention. In FIG. 13, a user equipment (UE) can communicate with two points, for example, a macro-eNB and a poci-eNB. Although this communication scheme may be referred to as CoMP as an example, the scope or spirit of the present invention is not limited thereto. In FIG. 13, a macro-eNB target SRS for obtaining DL CSI is transmitted in the form of aperiodic SRS (A-SRS), and a pico-eNB target SRS for obtaining UL CSI is transmitted in the form of a periodic SRS (P-SRS). If the UE (hereinafter referred to as CoMP UE) shows UL-heavy traffic, it may be preferable that frequent UL transmission be achieved toward a nearby pico-eNB, the pico-target SRS for UL CSI acquisition is aperiodically transmitted to support the frequent UL transmission toward the nearby pico-eNB, so that the corresponding PUSCH link adaptation is facilitated. In other words, assuming that the DL-heavy traffic situation is not given, the macro-eNB target SRS for DL CSI acquisition may sufficiently obtain the DL CSI because it performs A-SRS format transmission based on intermittent aperiodic triggering whenever the DL buffered data exists.

In the meantime, transmit power control (TPC) of the P-SRS is associated with the PC related to PUSCH, such that the P-SRS TPC cannot be controlled independently of PUSCH PC. In case of A-SRS, the above operation is intermittently performed as shown in the above-mentioned description, and the A-SRS is transmitted to a geographically distant cell (macro-eNB) as compared to the P-SRS as shown in FIG. 13, such that the A-SRS needs to operate separately from PC of PUSCH or P-SRS. For this purpose, A-SRS triggering information or a TPC command field of UL-associated (or DL-associated) DCI accompanying the A-SRS triggering information may affect only the PC of the corresponding A-SRS through higher layer signaling (e.g., RRC signaling), and specific information indicating whether the operation for preventing a PUSCH PC of the corresponding UL grant (or PUCCH PC of DL grant) from being affected by the TPC command field may be activated or deactivated. In this case, the above situation in which the A-SRS triggering is contained in or accompanied with DCI may indicate that the A-SRS triggering is contained in the DCI or not contained in the DCI and is separately applied to the UE. In addition, the A-SRS triggering may indicate that specific information of the DCI (e.g., uplink Tx power control information or TPC command field, etc.) may be issued for PC of the A-SRS.

As an example for indicating whether the above operation is activated, the TPC command field of UL-associated (or DL-associated) DCI that will accompany A-SRS triggering in future through higher layer signaling (e.g., RRC signaling) may be used only for the PC of the corresponding A-SRS, and specific information indicating whether the operation for preventing a PUSCH PC of the corresponding UL grant (or PUCCH PC of DL grant) from being affected by the TPC command field may be activated or deactivated. The higher layer signal may be 1 bit, and may indicate only whether the above operation is activated or deactivated. In this case, the deactivation state is identical to the legacy operation, and the activation state may indicate that the above operation for all A-SRS triggering actions is activated before the deactivation state is re-indicated. In addition, the higher layer signaling may be signaling of at least 2 bits. In this case, a default (or fallback) state indicating a deactivation state may be present, and other states may indicate an activation state of the above operation per specific A-SRS configuration.

In addition, the A-SRS triggering may be specific information contained in DCI format. For example, the A-SRS triggering may correspond to an SRS request field contained in the DCI format. In case of TDD, the A-SRS triggering may be contained in DCI formats 0, 1A, 2B, 2C, 2D and 4. In case of FDD, the A-SRS triggering may be contained in DCI formats 0, 1A and 4. If the A-SRS triggering may be specific information contained in DCI format, specific information indicating whether A-SRS is triggered per DL control channel or per DL subframe may be configured. However, the A-SRS triggering may not always be set to specific information contained in DCI format.

FIG. 14 exemplarily shows the ACK/NACK transmission for use in LTE-A. In FIG. 14, in the TDD system in which the ratio of a DL subframe to a UL subframe is denoted by 4:1, two component carriers (CCs) is set to 2, and a PDSCH having no PDCCH is not present.

As mentioned above, the explicit mapping scheme may be used in PUCCH resource indexing, and a specific field contained in DCI may be used as ARI. For example, the specific field contained in DCI may be denoted by a TPC command field (of 2 bits). Specifically, the TPC command field may be used to indicate ACK/NACK resources regarding the UL grant or DL grant contained in the DCI. Meanwhile, even in the above case, in order to avoid bundling of unnecessary time domain or CC domain, information as to whether the TPC command field is utilized may be decided according to a specific value indicated by a downlink assignment index (DAI) field contained in DCI. For example, if only DL CC linked to an ACK/NACK CC (Component Carrier) is configured in the UE, and if the DAI field value contained in DCI indicates the value of 1, the TPC command field contained in DCI may be used for PUCCH/PUSCH PC. That is, the TPC command field contained in DCI in one subframe of at least one radio frame must be used for PUCCH/PUSCH PC. In addition, if the DAI field value indicates another value other than '1', the TPC command field included in the DCI may be used as an ARI for indicating a resource region for ACK/NACK transmission. Meanwhile, if DL CC not linked to ACK/NACK CC is not configured in the UE, that is, the SCell CC is configured in the UW by carrier aggregation (CA), ACK/NACK transmission will be performed by PUCCH format 3.

In addition, upon receiving a downlink control signal (e.g., PDCCH) through which the DAI field value contained in the DCI indicates the value of 1, ACK/NACK transmission is performed using PUCCH resources (e.g., PUCCH format 1a/1b) based on the implicit mapping. In other cases, ACK/NACK transmission is performed using PUCCH resources (e.g., PUCCH format 3) based on the explicit mapping in which the TPC command field of the DCI is denoted by ARI.

However, the TPC command field may be used as ARI, and may also be used for A-SRS PC according to the embodiment. If the operation (TPC command field is used for A-SRS PC) is activated (i.e., if DCI (format) accompanies the A-SRS triggering, if DCI (format) does not accompany the A-SRS triggering, or if A-SRS triggering is not used), the operations or rules to be used for the embodiment of the present invention will hereinafter be described. In this case, the present invention must include even other examples in which carrier aggregation (CA) is configured, and will discriminate between PCell and SCell and disclose a variety of information associated with PCell and SCell in different ways. The PCell description will be applied to the example in which CA is not configured.

FIRST EXAMPLE

PCell-PDCCH Related Operation

A. DL-associated DCI format (e.g., 1A, 2B, 2C) accompanied with "DAI (or DAI counter)=1" may be specified in a manner that A-SRS triggering cannot be accompanied. That is, the DL-associated DCI format accompanied with "DAI=1" may always be received without A-SRS triggering, such that the corresponding TPC command field may be applied to PUCCH PC. As another method, the DL-associated DCI format accompanied with "DAI=1" within one radio frame (1 0 subframes) may occur a maximum of three times (e.g., corresponding to TDD structure having DL SF:UL SF=9:1). In consideration of the cases in which DL-associated DCI accompanied with "DAI=1" that occurs several times, only DL-associated DCI accompanied with an initial "DAI=1" value within one radio frame should be received without A-SRS triggering. That is, the specific situation in which the TPC command field of at least one DCI contained in one radio frame should be applied to PUCCH PC may be guaranteed.

B. When PCell-PDCCH signaling "DAI=1" is received without A-SRS triggering, and another PCell=PDCCH signaling "DAI=2" is received along with the A-SRS triggering, the TPC command field contained in the former case may be applied to the corresponding PUCCH PC, and the TPC command field contained in the latter case may be applied to A-SRS. If more PCell-PDCCH is not received, the ACK/NACK selection that uses implicit PUCCH resources (e.g., PUCCH formats 1a/1b) linked to each of PCell-PDCCH signaling "DAI=1" and PCell-PDCCH signaling "DAI=2" is performed. That is, the above ACK/NACK selection may indicate whether ACK/NACK channel selection based on PUCCH formats 1a/1b will be performed or the ACK/NACK bundling will be performed to as to transmit the above ACK/NACK information. In other words, the ACK/NACK selection based on the implicit PUCCH resources may indicate whether any one of the ACK/NACK channel selection and the ACK/NACK bundling is selected.

i. Only the PCell-PDCCH accompanied with the A-SRS triggering is continuously received within one radio frame, for example, PCell-PDCCH that additionally performs signaling of "DAI=3" is received along with the A-SRS triggering, and PCell-PDCCH that additionally performs signaling of "DAI=4" is also received along with the A-SRS triggering. As a result, in the case in which the PCell-PDCCH capable of using the TPC command field as the ARI is not received at all and it is impossible to perform multi-bit ACK/NACK coding using the explicit PUCCH resources (e.g., PUCCH format 3) based on the ARI, the ACK/NACK selection based on the implicit PUCCH resources (e.g., PUCCH formats 1 a/1b) linked to each PCell-PDCCH can be performed. In this case, the ACK/NACK selection may include ACK/NACK channel selection and/or CW bundling scheme, etc.

C. Assuming that PCell-PDCCH that performs signaling of DAI=1 is received without A-SRS triggering, and PCell-PDCCH having a specific DAI field value by which A-SRS triggering is not accompanied is received, this means that the multi-bit ACK/NACK coding that uses the explicit PUCCH resources (e.g., PUCCH format 3) on the basis of the TPC command field contained in the corresponding PCell-PDCCH, is performed on the basis of ARI (since A-SRS triggering is not accompanied, the corresponding TPC command field bits are replaced with ARI bits).

A-1. In the scheme different from the above A scheme, DL-associated DCI format including "DAI=1" may be defined to be accompanied with A-SRS triggering. In this case, if DL-associated DCI including "DAI=1" is received without A-SRS triggering, the operations shown in the above B and C sections are all valid. If the DL-associated DCI including "DAI=1" is received along with the A-SRS triggering, the corresponding TPC command field may be applied to PUCCH PC. This means that the TPC command field of at least one DCI within one radio frame can be applied to PUCCH PC.

i. Similarly to the technology disclosed in the A section, when considering exemplary cases in which DL-associated DCI including several 'DAI=1' values is transmitted in one radio frame (10 subframes), the above A-1 technology can be applied only the DL-associated DCI including the initial DAI=1 value within one radio frame.

ii. Irrespective of any rules described in the A-1 or A-1(i), the TPC command field contained in the DL-associated DCI including the corresponding "DAI=1" value is applied to PUCCH or A-SRS PC, such that the corresponding TPC command field is not used as ARI. That is, according to the ACK/NACK transmission scheme, the contents disclosed in the B, B(i), and C sections are all valid, so that the ACK/NACK transmission scheme can be decided.

SECOND EXAMPLE

Operations Related to SCell-PDCCH

This exemplary case indicates that the TPC command field is used as ARI in so far as A-SRS triggering is not accompanied with all DAI field values. Therefore, assuming that DCI not accompanied with at least one A-SRS triggering is transmitted to one radio frame, the multi-bit ACK/NACK coding is performed using the explicit PUCCH resources (e.g., PUCCH format 3) based on the corresponding ARI. If all DCIs contained in one radio frame are transmitted along with the A-SRS triggering, all the TPC command fields are applied to the corresponding A-SRS PC, such that the above multi-bit ACK/NACK coding cannot be performed due to the absence of ARI, and the ACK/NACK selection based on the implicit PUCCH resources (e.g., PUCCH formats 1a/1b) linked to each SCell-PDCCH can be performed. In this case, the ACK/NACK channel selection and/or the CW bundling scheme may be included in the above ACK/NACK selection.

THIRD EXAMPLE

Additional Operations

In association with all items described in the PCell-PDCCH associated operations for the first example and the SCell-PDCCH associated operations for the second example, only a maximum of N DCIs, each of which is accompanied with A-SRS triggering, in one radio frame may be transmitted. For example, N may be set to 1 (i.e., N=1). Alternatively, N=2, N=3, . . . may be possible, and different N values may also be assigned to individual TDD configurations. In addition to the above N restriction, a specific DAI field value (or subframe(s) of a specific index) through which DCI can be accompanied with N A-SRS triggering signals may be restricted. For example, there may arise some restriction so that the DCI accompanied with A-SRS triggering can be transmitted only to "DAI=1" in case of N=1. In another example, other restriction may also occur so that the DCI accompanied with A-SRS triggering can be transmitted only to DAI=1 (or DAI=3 or 4) in case of N=1. As described in the above A section of the first example, assuming that DCI corresponding to DAI=1 is not accompanied with A-SRS triggering in a manner that the TPC command field contained in the corresponding DCI can be used only for PUCCH PC, the DAI=1 value may allow the A-SRS triggering to be received along with DCI in association with the remaining DAI field values (e.g., DAI=2, 3 or 4).

Another technology capable of being commonly applied to the above examples may indicate that A-SRS triggering may be received only from DCI including an initial (or second or third) specific DAI field value within one radio frame. In addition, DCI accompanied with the A-SRS triggering can be transmitted only to subframe(s) of a specific index. In this case, according to a method for representing subframe(s) of the specific index, the subframes may be denoted in the form of a certain subframe bitmap, and it may also be possible to use another scheme in which a specific subframe index is indicated through a subframe period, an offset parameter, etc. Even in the other cases of N=2, N=3, N=4, ..., there may arise some restriction in which DCIs accompanied with N available A-SRS triggering signals can be transmitted only to specific DAI field value(s) (or subframe(s) of a specific index).

FIG. 15 exemplarily shows the ACK/NACK transmission operation for use in LTE-A. In FIG. 15, in the TDD system in which the ratio of DL subframes to UL subframes is denoted by 4:1, 2 component carriers (CCs) are present, and a PDSCH having no PDCCH is present in PCell CC.

FIG. 15 shows another operation format supported by LTE-A. In more detail, FIG. 15 exemplarily shows the presence of PDSCH (i.e., PDSCH w/o PDCCH) that is transmitted without PDCCH through a PCell. If the PDSCH W/o PDCCH are present, the TPC command field contained in PCell-PDCCH signaling "DAI=1" is used to transmit the TPC command for PUCCH PC, and the TPC command field contained in PCell-PDCCH signaling other DAI field values other than "1" may be used to transmit the ARI. In addition, if the UE receives a PDSCH w/o PDCCH and/or a PCell-PDCCH signaling "DAI=1", ACK/NACK selection is performed using implicit PUCCH resources (e.g., PUCCH formats 1a/1b) linked to the corresponding PCell-PDCCH and other PUCCH resources (e.g., PUCCH formats 1a/1b) reserved for the PDSCH w/o PDCCH. In other cases, it is necessary to perform multi-bit ACK/NACK coding based on the explicit PUCCH resources (e.g., PUCCH format 3) indicated by ARI using the TPC command field contained in the received DCI as an ARI.

Under the environment of FIG. 15, if the TPC command field is used for A-SRS PC, the operation or rules to be used for the embodiment of the present invention will hereinafter be described. The present invention must include even other examples in which carrier aggregation (CA) is configured, and will discriminate between PCell and SCell and disclose a variety of information associated with PCell and SCell in different ways. The PCell description will be applied to the example in which CA is not configured.

FOURTH EXAMPLE

Operations Associated with PCell-PDCCH

If a subframe in which PDSCH w/o PDCCH is transmitted is present, PDCCH is not received so that the TPC command field to be used as ARI is not present. Therefore, all proposed technologies described in the PCell-PDCCH operations of the first example can be applied to the present invention without change according to whether or not DCI accompanied with ARI in one radio frame is transmitted (a subframe in which PDSCH w/o PDCCH is transmitted is used in the exemplary case in which DCI accompanied with ARI is not transmitted). If DCI accompanied with ARI is not present in the case of ACK/NACK transmission, the ACK/NACK selection or the like is performed using not only PUCCH resources (e.g., PUCCH formats 1a/1b) reserved for the PDSCH w/o PDCCH but also the implicit PUCCH resources (e.g., PUCCH formats 1a/1b) linked to each PCell-PDCCH. For example, according to the example of PCell-PDCCH of FIG. 15, if DCI accompanied with A-SRS triggering is not present or only DCI including "DAI=1" of DL SF#1 is accompanied with A-SRS triggering, DCI including "DAI=2" of DL SF#4 is not accompanied with A-SRS triggering, the multi-bit ACK/NACK coding is performed using the implicit PUCCH resources (e.g., PUCCH format 3) based on the corresponding ARI. Alternatively, if DCI including "DAI=2" of DL SF#4 is accompanied with A-SRS triggering, the corresponding TPC command field is used as A-SRS PC, DCI accompanied with ARI is not transmitted at all within the corresponding radio frame, the ACK/NACK selection or the like is performed using not only PUCCH resources (e.g., PUCCH formats 1a/1b) reserved for the PDSCH w/o PDCCH but also the implicit PUCCH resources (e.g., PUCCH formats 1a/1b) linked to each PCell-PDCCH.

In other words, according to the proposed scheme, assuming that a subframe in which PDSCH w/o PDCCH is transmitted is present in a specific radio frame, the following operations (a) and (b) are performed. In case of the operation (a), if DCI including the TPC command field is transmitted without A-SRS triggering from among other subframes, the corresponding TPC command field is used as ARI so that the multi-bit ACK/NACK coding based on the explicit PUCCH resources (e.g., PUCCH format 3) is performed using the corresponding TPC command field as an ARI. In case of the operation (b), if DCI including the TPC command field capable of being used as the ARI from among other subframes is not transmitted at all (i.e., if all DCIs are accompanied with A-SRS triggering, or if the corresponding TPC is applied to PUCCH PC without A-SRS triggering), the ACK/NACK selection or the like is performed using not only PUCCH resources (e.g., PUCCH formats 1a/1b) reserved for the PDSCH w/o PDCCH but also the implicit PUCCH resources (e.g., PUCCH formats 1a/1b) linked to each PCell-PDCCH. In this case, the ACK/NACK selection may include ACK/NACK channel selection and/or CW bundling scheme, etc.

FIFTH EXAMPLE

Operations Associated with SCell-PDCCH

So long as A-SRS triggering is not accompanied with all DAI field values, the TPC command field can be used as ARI. Therefore, if at least one DCI not accompanied with A-SRS triggering is transmitted to one radio frame, the multi-bit ACK/NACK coding based on the explicit PUCCH resources (e.g., PUCCH format 3) is performed on the basis of the TPC command field contained in the corresponding DCI. If all DCIs accompanied with A-SRS triggering are transmitted to one radio frame, the individual TPC command fields are applied to the corresponding A-SRS PC, and information indicating the ACK/NACK resource region is not present so that it is impossible to perform the multi-bit ACK/NACK coding. ACK/NACK selection or the like can be performed using the implicit PUCCH resources (e.g., PUCCH formats 1a/1b) linked to each SCell-PDCCH. In this case, the ACK/NACK selection may include ACK/NACK channel selection and/or CW bundling scheme, etc.

SIXTH EXAMPLE

Additional Operations

In association with all items described in the fourth example and the fifth example, only a maximum of N DCIs, each of which is accompanied with A-SRS triggering, in one radio frame may be transmitted. For example, N may be set to 1 (i.e., N=1). Alternatively, N=2, N=3, . . . may be possible, and different N values may also be assigned to individual TDD configurations. In addition to the above N restriction, a specific DAI field value (or subframe(s) of a specific index) through which DCI can be accompanied with N A-SRS triggering signals may be restricted. As an example of the additional operations, all the examples described in the third example can be applied to the present invention.

Figure 16:
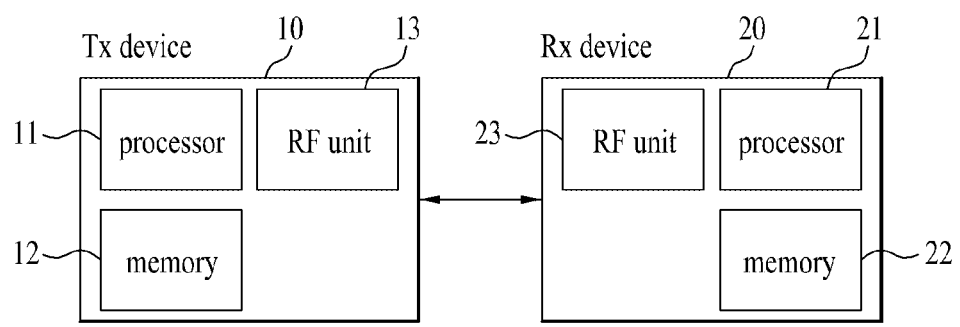
FIG. 16 is a block diagram illustrating a radio frequency (RF) device according to an embodiment of the present invention.

FIG. 16 is a block diagram of a transmitting device 10 and a receiving device 20 configured to implement exemplary embodiments of the present invention.

Referring to FIG. 16, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmission device 10 on uplink and as the receiving device 20 on downlink. In embodiments of the present invention, an eNB serves as the receiving device 20 on uplink and as the transmission device 10 on downlink.

The transmitting device 10 and/or the receiving device 20 may be configured as a combination of one or more embodiments of FIGS. 13 to 15.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

INDUSTRIAL APPLICABILITY

The present invention can be applied to a UE, an eNB, or other communication devices of the wireless communication system.

The invention claimed is:

1. A method for transmitting an acknowledgement/negative-acknowledgement (ACK/NACK) signal by a user equipment (UE) in a wireless communication system, the method comprising:
    detecting control channels on multiple component carriers in a downlink subframe of a radio frame,
    wherein ACK/NACK signal for the detected control channels or data channels corresponding to the detected control channels is transmitted in an uplink (UL) resource region;
    determining whether UL transmission (Tx) power control fields received at a respective one of the detected control channels are used as values to indicate the UL resource region for transmission of the ACK/NACK signal based on whether a respective one of the detected control channels carries triggering information for activating use of at least one of the UL Tx power control fields received at the respective one of the detected control channels for aperiodic sounding reference signal (SRS) power control;
    transmitting the ACK/NACK signal in the UL resource region based on a result of the determining; and
    if all of the UL Tx power control fields received at the respective one of the detected control channels are not used as values to indicate the UL resource region for transmission of the ACK/NACK signal, transmitting the ACK/NACK signal in the UL resource region linked to the respective one of the detected control channels.

2. The method according to claim 1, further comprising:
    if at least one of the UL Tx power control fields received at the respective one of the detected control channels is used as a specific value for indicating the UL resource region for transmission of the ACK/NACK signal, transmitting the ACK/NACK signal for all the detected control channels in the UL resource region indicated by the specific value.

3. The method according to claim 1, wherein:
    if at least one of the UL Tx power control fields is activated to be used for power control of the aperiodic SRS, the at least one UL Tx power control field is not used as a specific value for indicating the UL resource region for transmission of the ACK/NACK signal.

4. The method according to claim 1, wherein the triggering information is provided for either each downlink subframe in the radio frame or each control channel.

5. The method according to claim 1, wherein:
    if a downlink assignment index (DAI) received at the respective one of the detected control channels is set to 1, the at least one UL Tx power control field is not activated to be used for power control of the aperiodic SRS.

6. The method according to claim 1, wherein the UL Tx power control fields include a Transmit Power Control (TPC) command field contained in downlink control information (DCI).

7. A user equipment (UE) device configured to transmit an acknowledgement/negative-acknowledgement (ACK/NACK) signal in a wireless communication system, the UE device comprising:
    a radio frequency (RF) unit; and
    a processor configured to control the RF unit,
    wherein the processor is configured to detect control channels on multiple component carriers in a downlink subframe of a radio frame, and transmit ACK/NACK signal for the detected control channels or data channels corresponding to the detected control channels in an uplink (UL) resource region,
    wherein the processor is configured to determine whether UL transmission (Tx) power control fields received at a respective one of the detected control channels are used as values to indicate the UL resource region for transmission of the ACK/NACK signal based on whether a respective one of the detected control channels carries triggering information for activating use of at least one of the UL Tx power control fields received at the respective one of the detected control channels for aperiodic sounding reference signal (SRS) power control, and transmit the ACK/NACK signal in the UL resource region based on a result of the determination, and
    if all of the UL Tx power control fields received at the respective one of the detected control channels are not used as values to indicate the UL resource region for transmission of the ACK/NACK signal, the processor is configured to transmit the ACK/NACK signal in the UL resource region linked to the respective one of the detected control channels.

8. The UE device according to claim 7, further comprising:
    if at least one of the from among UL Tx power control fields received at the respective one of the detected control channels is used as a specific value for indicating the UL resource region for transmission of the ACK/NACK signal, the processor is configured to transmit the ACK/NACK signal for all the detected control channels in the UL resource region indicated by the specific value.

9. The UE device according to claim 7, wherein:
    if at least one of the UL Tx power control fields is activated to be used for power control of the aperiodic SRS, the at lest one UL Tx power control field is not used as a specific value for indicating the UL resource region for transmission of the ACK/NACK signal.

10. The UE device according to claim 7, wherein the triggering information is provided for either each downlink subframe in the radio frame or each control channel.

11. The UE device according to claim 7, wherein:
    if a downlink assignment index (DAI) received at the respective one of the detected control channels is set to 1, the at least one UL Tx power control field is not activated to be used for power control of the aperiodic SRS.

12. The UE device according to claim 7, wherein the UL Tx power control fields include a Transmit Power Control (TPC) command field contained in downlink control information (DCI).

* * * * *